US012626408B2

(12) United States Patent (10) Patent No.: US 12,626,408 B2
Yako et al. (45) Date of Patent: May 12, 2026

(54) IMAGE PROCESSING APPARATUS, IMAGING SYSTEM, AND METHOD FOR ESTIMATING ERROR IN RECONSTRUCTED IMAGES

(71) Applicant: Panasonic Intellectual Property Management Co., Ltd., Osaka (JP)

(72) Inventors: Motoki Yako, Osaka (JP); Takayuki Kiyohara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 293 days.

(21) Appl. No.: 18/482,065

(22) Filed: Oct. 6, 2023

(65) Prior Publication Data

US 2024/0037798 A1 Feb. 1, 2024

Related U.S. Application Data

(63) Continuation of application No. PCT/JP2022/017373, filed on Apr. 8, 2022.

(30) Foreign Application Priority Data

Apr. 28, 2021 (JP) ................................. 2021-075808

(51) Int. Cl.
*G06V 10/00* (2022.01)
*G01J 3/28* (2006.01)
(Continued)

(52) U.S. Cl.
CPC .............. *G06T 9/00* (2013.01); *G01J 3/2823* (2013.01); *G06V 10/761* (2022.01); *H04N 23/95* (2023.01)

(58) Field of Classification Search
CPC .... G06V 10/82; G06V 10/761; G06V 10/762; G06V 10/764; G06V 10/765;
(Continued)

(56) References Cited

U.S. PATENT DOCUMENTS 4,546,466 A * 10/1985 Lopiccolo .............. G01D 5/268
398/91
7,356,190 B2 * 4/2008 Mizoguchi ........... G06V 40/162
375/240
(Continued)

FOREIGN PATENT DOCUMENTS

JP 2016-156801 9/2016
JP 2017-208641 11/2017

OTHER PUBLICATIONS

International Search Report of PCT application No. PCT/JP2022/017373 dated Jun. 28, 2022.

*Primary Examiner* — Amir Alavi

(74) *Attorney, Agent, or Firm* — Wenderoth, Lind & Ponack, L.L.P.

(57) ABSTRACT

An image processing apparatus includes a storage device storing coding information indicating light transmission characteristics of an encoding mask including optical filters that are arranged in two dimensions and whose light transmission characteristics are different from one another and a signal processing circuit that generates reconstructed images on a basis of a compressed image generated through imaging that employs the encoding mask and the coding information, that estimates an error in the reconstructed images, and that outputs a signal indicating the error.

19 Claims, 22 Drawing Sheets

(51) Int. Cl.
    *G06T 9/00*       (2006.01)
    *G06V 10/74*     (2022.01)
    *H04N 23/95*    (2023.01)

(58) Field of Classification Search
    CPC ...... G06V 10/98; G06V 10/143; G06V 10/62;
              G06V 10/58; G06T 9/00; H04N 23/60;
              H04N 23/95; G01J 3/0229; G01J 3/027;
                      G01J 3/2823; G01J 2003/2873
    See application file for complete search history.

(56)               References Cited

U.S. PATENT DOCUMENTS

| | | | |
|---|---|---|---|
| 8,947,501 | B2 * | 2/2015 | Corcoran ............. H04N 23/698 |
| | | | 348/36 |
| 10,657,446 | B2 * | 5/2020 | Kamilov ................. G06N 3/084 |
| 10,789,742 | B2 * | 9/2020 | Li .............................. G06T 5/70 |
| 10,796,200 | B2 * | 10/2020 | Sutic ..................... G06T 1/0014 |
| 10,798,364 | B2 * | 10/2020 | Yuan .................... H04N 13/243 |
| 11,461,592 | B2 * | 10/2022 | Javidi ..................... G06V 10/25 |
| 11,869,141 | B2 * | 1/2024 | Tong ................... G06V 10/255 |
| 2014/0187259 | A1 * | 7/2014 | Kakani ...................... G01S 5/08 |
| | | | 455/456.1 |
| 2016/0138975 | A1 | 5/2016 | Ando et al. |
| 2016/0255332 | A1 * | 9/2016 | Nash .................... H04L 1/0045 |
| | | | 348/46 |
| 2017/0339363 | A1 | 11/2017 | Hiasa |
| 2019/0340497 | A1 | 11/2019 | Baraniuk et al. |
| 2024/0037798 | A1 * | 2/2024 | Yako ..................... G06V 10/58 |

* cited by examiner

| MEASUREMENT DATE | ESTIMATED MSE |
|:---:|:---:|
| 1.1.2021 | 40.3 |
| 1.2.2021 | 40.4 |
| 1.3.2021 | 40.4 |
| 1.4.2021 | 40.5 |
| 1.5.2021 | 40.5 |
| 1.6.2021 | 40.6 |

IMAGE PROCESSING APPARATUS, IMAGING SYSTEM, AND METHOD FOR ESTIMATING ERROR IN RECONSTRUCTED IMAGES

BACKGROUND

1. Technical Field

The present disclosure relates to an image processing apparatus, an imaging system, and a method for estimating an error in reconstructed images.

2. Description of the Related Art

Compressed sensing is a technique for reconstructing more data than observed data by assuming that distribution of data regarding an object of observation is sparse in a certain space (e.g., a frequency space). Compressed sensing may be applied, for example, to an imaging device that reconstructs, from a small amount of data observed, an image including more information. When compressed sensing is applied to an imaging device, an optical filter having a function of coding an optical image in terms of space and wavelength is used. The imaging device captures an image of a subject through the optical filter and generates reconstructed images through an operation. As a result, various effects such as increased image resolution and an increased number of obtained wavelengths, reduced imaging time, and increased sensitivity can be produced.

U.S. Pat. No. 9,599,511 discloses an example where a compressed sensing technique is applied to a hyperspectral camera that obtains images of different wavelength bands, each of which is a narrow band. With the technique disclosed in this example of the related art, a hyperspectral camera that generates high-resolution and multiwavelength images can be achieved.

Japanese Patent No. 6672070 discloses a super-resolution method for generating, using a compressed sensing technique, a high-resolution monochrome image from a small amount of information observed.

U.S. Patent Application Publication No. 2019/0340497 discloses a method for generating an image of higher resolution than that of an obtained image by applying a convolutional neural network (CNN) to the obtained image.

SUMMARY

One non-limiting and exemplary embodiment provides a technique for improving reliability of images generated through a reconstruction process that assumes sparsity and a result of an analysis based on the images.

In one general aspect, the techniques disclosed here feature an image processing apparatus according to an aspect of the present disclosure includes a storage device storing coding information indicating light transmission characteristics of an encoding mask including optical filters that are arranged in two dimensions and whose light transmission characteristics are different from one another and a signal processing circuit that generates a reconstructed image on a basis of a compressed image generated through imaging that employs the encoding mask and the coding information, that estimates an error in the reconstructed image, and that outputs a signal indicating the error.

According to the aspect of the present disclosure, reliability of images generated through a reconstruction process that assumes sparsity and a result of an analysis based on the images improves.

It should be noted that general or specific aspects of the present disclosure may be implemented as a system, an apparatus, a method, an integrated circuit, a computer program, a computer-readable storage medium such as a storage disc, or any selective combination thereof. The computer-readable storage medium may include, for example, a non-volatile storage medium such as a compact disc read-only memory (CD-ROM). The apparatus may include one or more apparatuses. When the apparatus includes two or more apparatuses, the two or more apparatuses may be provided in a single device or separately provided in two or more discrete devices. The "apparatus" herein and in the claims can refer to one apparatus or a system including apparatuses.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1A:
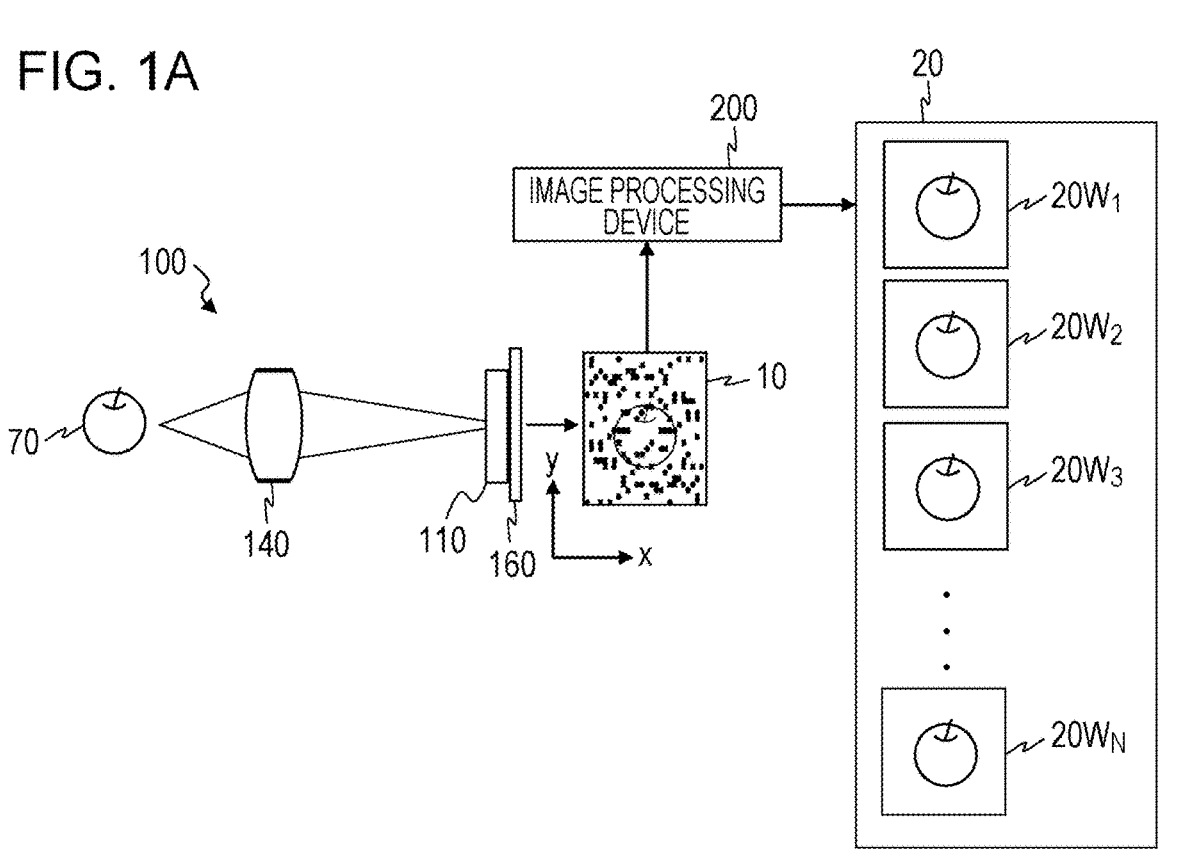
FIG. 1A is a diagram schematically illustrating an example of the configuration of an imaging system.

Embodiments that will be described hereinafter are general or specific examples. Values, shapes, materials, components, arrangement, positions, and connection modes of the components, steps, order of the steps, layout of displayed screens, and the like mentioned in the following embodiments are examples, and are not intended to limit the technique in the present disclosure. Among the components in the following embodiments, ones not described in the independent claims, which define the broadest concepts, will be described as optional components. The drawings are schematic diagrams, and not necessarily strict illustrations. Furthermore, in the drawings, substantially the same or similar components are given the same reference numerals. Redundant description might be omitted or simplified.

In the present disclosure, all or some of circuits, units, apparatuses, members, or parts, or all or some of functional blocks in block diagrams, may be implemented by, for example, one or more electronic circuits including a semiconductor device, a semiconductor integrated circuit (IC), or a large-scale integration (LSI). An LSI or an IC may be integrated on a single chip, or may be achieved by combining together chips. Functional blocks other than storage devices, for example, may be integrated on a single chip. Although the term LSI or IC is used here, a term used changes depending on a degree of integration, and system LSI, very-large-scale integration (VLSI), or ultra-large-scale integration (ULSI) may be used, instead. A field-programmable gate array (FPGA), which is programmed after an LSI is fabricated, or a reconfigurable logic device, where coupling relationships inside an LSI can be reconfigured or circuit sections inside an LSI can be set up, can be used for the same purposes.

Furthermore, functions or operations of all or some of the circuits, the units, the apparatuses, the members, or the parts can be implemented through software processing. In this case, software is stored in one or more non-transitory storage media, such as read-only memories (ROMs), optical discs, or hard disk drives, and, when a processor executes the software, the processing device and peripheral devices execute a function specified by the software. A system or an apparatus may include one or more non-transitory storage media storing the software, the processor, and necessary hardware devices including, for example, an interface.

Underlying Knowledge Forming Basis of Present Disclosure

Before describing an embodiment of the present disclosure, an error that occurs in sparsity-based image reconstruction, which is a problem to be solved by the present disclosure, will be described.

Sparsity refers to a condition where an element that characterizes an object of observation is sparse in a certain space (e.g., a frequency space). Sparsity is widely found in nature. By using sparsity, necessary information can be efficiently observed. A sensing technique that employs sparsity is called a compressed sensing technique. By using the compressed sensing technique, highly efficient devices and systems can be constructed.

As specific applications of the compressed sensing technique, hyperspectral cameras with improved wavelength resolution, such as one disclosed in U.S. Pat. No. 9,599,511, and imaging devices capable of improving resolution (i.e., super-resolution), such as one disclosed in Japanese Patent No. 6672070, have been proposed.

Imaging devices that employ compressed sensing include, for example, an optical filter having random light transmission characteristics with respect to space and/or wavelength. Such an optical filter will be referred to as a "encoding mask" hereinafter. An encoding mask is provided in an optical path of light incident on an image sensor and transmits light incident from a subject with different light transmission characteristics depending on an area thereof. This process achieved by the encoding mask will be referred to as "coding". An optical image coded by the encoding mask is captured by the image sensor. An image generated through imaging based on an encoding mask will be referred to as a "compressed image" hereinafter. Information indicating light transmission characteristics of an encoding mask (hereinafter referred to as "mask information") is stored in a storage device in advance. A processor of an imaging device performs a reconstruction process on the basis of a compressed image and mask information. As a result of the reconstruction process, reconstructed images including more information (e.g., higher-resolution image information or more-wavelength image information) than the compressed image are generated. The mask information may be, for example, information indicating spatial distribution of a transmission spectrum (also referred to as "spectral transmittances") of the encoding mask. Through a reconstruction process based on such mask information, an image corresponding to each of wavelength bands can be reconstructed from one compressed image.

The reconstruction process includes an estimation operation that assumes sparsity of an object of observation. The estimation operation is sometimes called "sparse reconstruction". Since sparsity is assumed, an estimation error is caused in accordance with a non-sparse component of the object of observation. The operation performed in sparse reconstruction may be, for example, a data estimation operation disclosed in U.S. Pat. No. 9,599,511 where an evaluation function is minimized by incorporating a regularization term, such as a discrete cosine transform (DCT), a wavelet transform, a Fourier transform, or total variation (TV). Alternatively, an operation that employs a CNN may be performed as disclosed in U.S. Patent Application Publication No. 2019/0340497. Although this example of the related art does not specify a function based on sparsity, but discloses an operation that employs sparsity of compressed sensing.

When an operation for constructing more data than observed information is performed, an estimation error is caused because equations for an underdetermined system (i.e., a system with fewer variables than equations) are solved. The caused estimation error results in an output image different from an image showing an actual object of observation. As a result, reliability of an output image is undermined, and when an image analysis is conducted using the output image, reliability of a result of the analysis is also undermined.

On the basis of the above examination, the present inventors arrived at configurations according to embodiments of the present disclosure that will be described hereinafter. An outline of the embodiments of the present disclosure will be described hereinafter.

An image processing apparatus according to an embodiment of the present disclosure includes a storage device storing coding information indicating light transmission characteristics of an encoding mask including optical filters that are arranged in two dimensions and whose light transmission characteristics are different from one another and a signal processing circuit that generates a reconstructed image on a basis of a compressed image generated through imaging that employs the encoding mask and the coding information, that estimates an error in the reconstructed image, and that outputs a signal indicating the error.

With this configuration, an error in reconstructed images can be output. For example, an image indicating an error in reconstructed images can be output to a display device. A user, therefore, can easily understand whether accurate reconstructed images have been generated. If reconstructed images with a large error have been generated, the user can easily address the situation by, for example, performing reconstruction again. As a result, reliability of reconstructed images and a result of an analysis based on the reconstructed images improves.

In an embodiment, the signal processing circuit estimates the error on a basis of the compressed image, the reconstructed images, and the coding information. For example, the signal processing circuit may estimate the error on the basis of the compressed image, the reconstructed images, and a value of an evaluation function based on the coding information. An example of the evaluation function will be described later.

The storage device may also store a reference image indicating a reference subject. The compressed image may be generated by capturing, using the encoding mask, an image of a scene including the reference subject and a target subject to be obtained through reconstruction. The signal processing circuit may estimate the error on a basis of comparison between the reference image and an area in the reconstructed images indicating the reference subject.

The storage device may also store reference information indicating a spectrum of a reference subject. The compressed image may be generated by capturing, using the encoding mask, an image of a scene including the reference subject and a target subject to be obtained through reconstruction. The signal processing circuit may estimate the error on a basis of a difference between spectra of an area in the reconstructed images corresponding to the reference subject and the spectrum indicated by the reference information.

The storage device may also store reference information indicating a spatial frequency of a reference subject. The compressed image may be generated by capturing, using the encoding mask, an image of a scene including the reference subject and a target subject to be obtained through reconstruction. The signal processing circuit may estimate the error on a basis of a difference between spatial frequencies of an area in the reconstructed images corresponding to the reference subject and the spatial frequency indicated by the reference information.

The reference information may be generated on a basis of an image obtained by capturing, using the encoding mask, an image of a scene including the reference subject. The reference information may be stored in the storage device during manufacturing or when the user performs an operation for capturing an image of the reference subject.

The signal processing circuit may output a warning if magnitude of the error exceeds a threshold. The warning may be, for example, a signal for causing the display device, a sound output device, or a light source to issue a warning based on an image, a sound, or light. By outputting a warning, the user can be notified that a reconstruction error is large.

The signal processing circuit may store the estimated error, predict, on a basis of temporal changes in the error, a time when the error will exceed a threshold, and output a signal indicating the predicted time. This configuration is effective when reconstructed images are repeatedly generated for objects of the same type as in inspection of products. Information regarding temporal changes in an error can be obtained by storing an error each time a reconstruction process is performed. Deterioration of the imaging device can be estimated, for example, on the basis of temporal changes in an error, and a time when the error will exceed a threshold can be predicted as described above.

The optical filters may have different spectral transmittances. The reconstructed images may include image information regarding wavelength bands. With this configuration, image information regarding each of wavelength bands (e.g., four or more wavelength bands) can be reconstructed from a compressed image.

The signal processing circuit may display the error and spatial variation in pixel values in the reconstructed images on a display device in a distinguishable manner. As a result, the user can easily understand an error in reconstructed images and spatial variation in a pixel value of the reconstructed images.

An imaging system according to another embodiment of the present disclosure includes the image processing apparatus according to the embodiment of the present disclosure, the encoding mask, and an image sensor. The imaging system can generate a compressed image through imaging that employs an encoding mask, generate reconstructed images on the basis of the compressed image and coding information, and estimate an error in the reconstructed images.

A method according to yet another embodiment of the present disclosure is a method executed by a processor. The method includes obtaining coding information indicating light transmission characteristics of an encoding mask including optical filters that are arranged in two dimensions and whose light transmission characteristics are different from one another, obtaining a compressed image generated through imaging that employs the encoding mask, generating reconstructed images on a basis of the coding information, estimating an error in the reconstructed images, and outputting a signal indicating the error.

A recording medium according to yet another embodiment of the present disclosure is non-transitory and computer-readable. The recording medium stores a program causing a computer to execute a method including obtaining coding information indicating light transmission characteristics of an encoding mask including optical filters that are arranged in two dimensions and whose light transmission characteristics are different from one another, obtaining a compressed image generated through imaging that employs the encoding mask, generating, on a basis of the coding information, reconstructed images including more signals than signals included in the compressed image, estimating an error in the reconstructed images, and outputting a signal indicating the error.

An exemplary embodiment of the present disclosure will be described more specifically hereinafter.

Embodiment

First, an example of the configuration of an imaging system used in the exemplary embodiment of the present disclosure will be described.

1. Imaging System

FIG. 1A is a diagram schematically illustrating an example of the configuration of the imaging system. This system includes an imaging device 100 and an image processing device 200. The imaging device 100 has the same configuration as that of an imaging device disclosed in U.S. Pat. No. 9,599,511. The imaging device 100 includes an optical system 140, a filter array 110, and an image sensor 160. The optical system 140 and the filter array 110 are provided in an optical path of light incident from an object 70, which is a subject. The filter array 110 in the example illustrated in FIG. 1A is provided between the optical system 140 and the image sensor 160.

FIG. 1A illustrates an apple as an example of the object 70. The object 70 is not limited to an apple, and may be any object. The image sensor 160 generates data regarding a compressed image 10, which is obtained by compressing information regarding wavelength bands as a two-dimensional monochrome image. The image processing device 200 generates image data regarding each of wavelength bands included in a certain target wavelength range on the basis of the data regarding the compressed image 10 generated by the image sensor 160. The generated image data regarding wavelength bands will be referred to as a "hyperspectral (HS) data cube" or "hyperspectral image data". The number of wavelength bands included in the target wavelength range is N (N is an integer larger than or equal to 4). In the following description, generated image data regarding wavelength bands will be referred to as reconstructed images $20W_1$, $20W_2$, . . . , and $20W_N$, which will be collectively referred to as "hyperspectral images 20" or an "HS data cube 20". Data or a signal indicating an image, that is, a set of data or signals indicating pixel values of pixels, will be simply referred to as an "image" herein.

The filter array 110 according to the present embodiment is an array of filters that have translucency and that are arranged in rows and columns. The filters include filters of different types whose spectral transmittances, that is, wavelength dependence of optical transmittances, are different from one another. The filter array 110 modulates intensity of incident light by wavelength and outputs the incident light. This process achieved by the filter array 110 will be referred to as "coding", and the filter array 110 will be referred to as an "encoding element" or a "encoding mask".

In the example illustrated in FIG. 1A, the filter array 110 is provided near or on the image sensor 160. Here, "near" refers to a situation where the filter array 110 and the image sensor 160 are so close to each other that an optical image from the optical system 140 is formed on a surface of the filter array 110 somewhat clearly. "On" refers to a situation where the filter array 110 and the optical system 140 are so close to each other that a gap is hardly caused. The filter array 110 and the image sensor 160 may be integrated with each other.

The optical system 140 includes at least one lens. Although FIG. 1A illustrates the optical system 140 as one lens, the optical system 140 may be a combination of lenses, instead. The optical system 140 forms an image on an imaging surface of the image sensor 160 through the filter array 110.

Figure 1B:
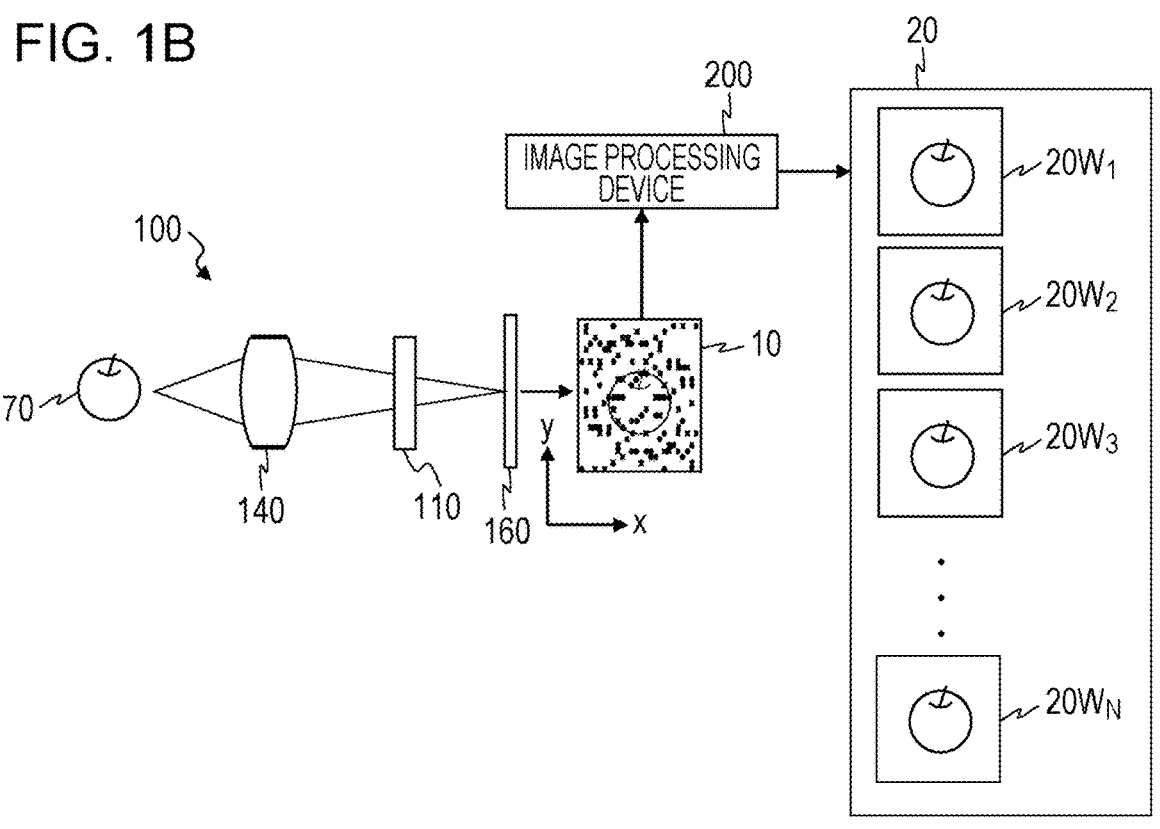
FIG. 1B is a diagram schematically illustrating another example of the configuration of the imaging system.
Figure 1C:
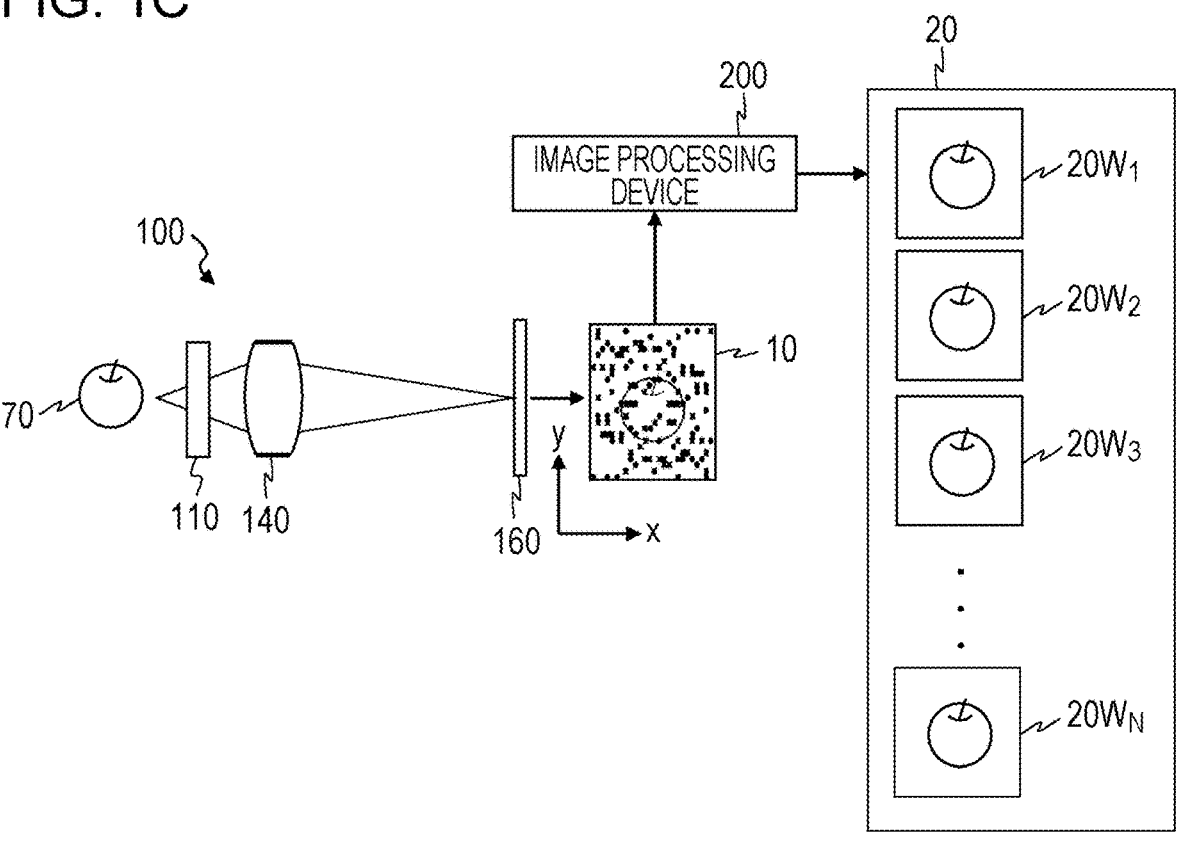
FIG. 1C is a diagram schematically illustrating yet another example of the configuration of the imaging system.
Figure 1D:
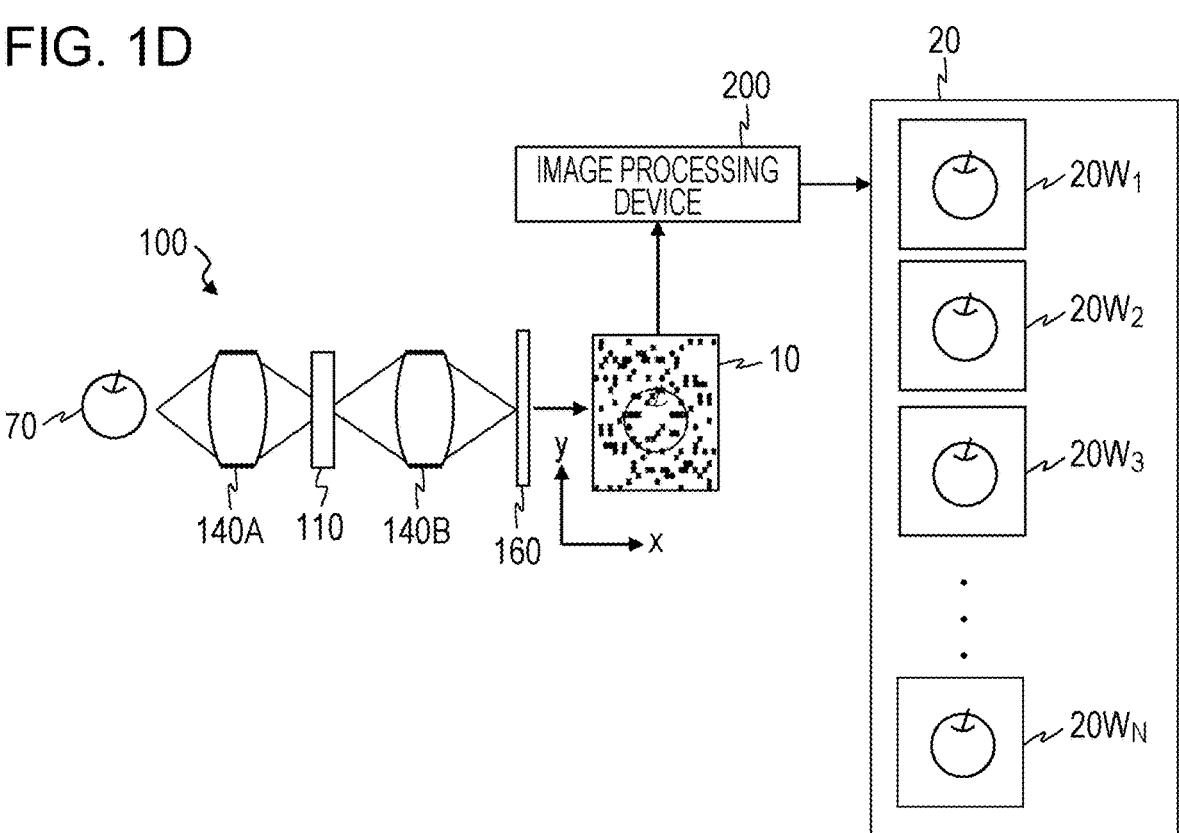
FIG. 1D is a diagram schematically illustrating yet another example of the configuration of the imaging system.

The filter array 110 may be disposed at a distance from the image sensor 160. FIGS. 1B to 1D are diagrams illustrating examples of the configuration of the imaging device 100 where the filter array 110 is disposed at a distance from the image sensor 160. In the example illustrated in FIG. 1B, the filter array 110 is disposed between the optical system 140 and the image sensor 160 at a distance from the image sensor 160. In the example illustrated in FIG. 1C, the filter array 110 is disposed between the object 70 and the optical system 140. In the example illustrated in FIG. 1D, the imaging device 100 includes two optical systems 140A and 140B, and the filter array 110 is disposed between the optical systems 140A and 140B. As in these examples, an optical system including one or more lenses may be provided between the filter array 110 and the image sensor 160.

The image sensor 160 is a light detection device of a monochrome type including light detection elements (also referred to as "pixels" herein) arranged in two-dimensions. The image sensor 160 may be, for example, a charge-coupled device (CCD), a complementary metal-oxide-semiconductor (CMOS) sensor, or an infrared array sensor. The light detection elements include, for example, photodiodes. The image sensor 160 need not necessarily be a sensor of a monochrome type. For example, a sensor of a color type including R/G/B, R/G/B/IR, or R/G/B/W filters may be used, instead. When a sensor of a color type is used, the amount of information regarding wavelengths can be increased, thereby improving accuracy of reconstructing the hyper spectral images 20. A target wavelength range may be determined as desired, and may be a visible wavelength range, or an ultraviolet, near-infrared, mid-infrared, or far-infrared wavelength range.

The image processing device 200 may be a computer including one or more processors and one or more storage media such as memories. The image processing device 200 generates data regarding reconstructed images $20W_1$, $20W_2$, . . . , and $20W_N$ on the basis of a compressed image 10 obtained by the image sensor 160.

Figure 2A:
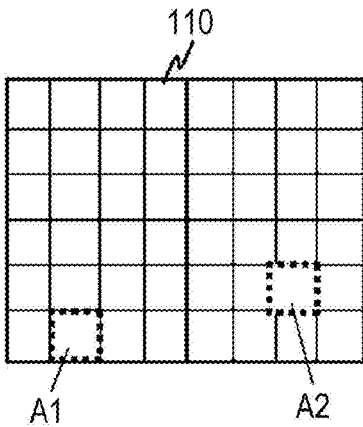
FIG. 2A is a diagram schematically illustrating an example of a filter array.

FIG. 2A is a diagram schematically illustrating an example of the filter array 110. The filter array 110 includes areas arranged in two dimensions. The areas will be referred to as "cells" herein. In each area, an optical filter having an individually set spectral transmittance is provided. The spectral transmittance is indicated by a function $T(\lambda)$, where wavelength of incident light is denoted by $\lambda$. The spectral transmittance $T(\lambda)$ ranges from 0 to 1.

In the example illustrated in FIG. 2A, the filter array 110 includes forty-eight rectangular areas arranged in six rows and eight columns. This is just an example, and more areas may be provided in practice. The areas may be as many as, for example, the pixels of the image sensor 160. The number of filters included in the filter array 110 may be determined in accordance with a purpose within a range of, say, tens to thousands.

Figure 2B:
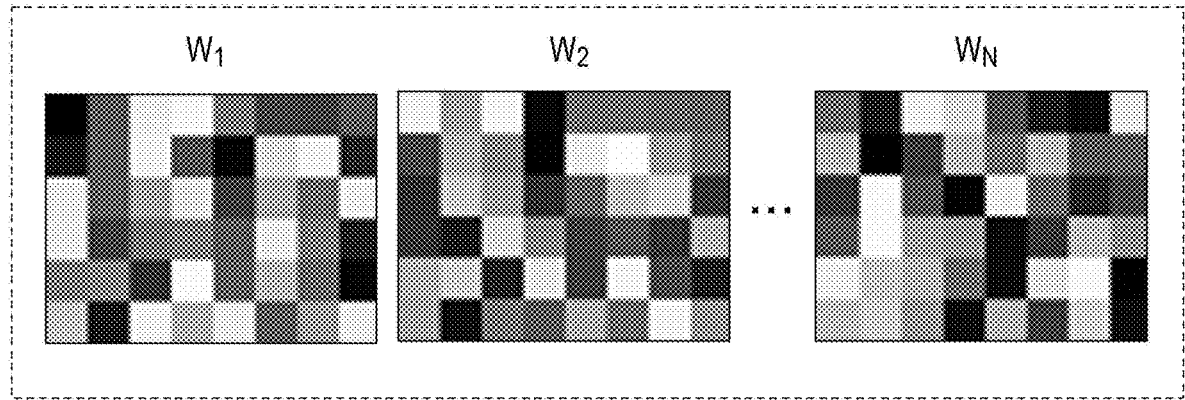
FIG. 2B is a diagram illustrating an example of spatial distribution of optical transmittances of wavelength bands $W_1$, $W_2$, . . . , and $W_N$ included in a target wavelength range.

FIG. 2B is a diagram illustrating an example of spatial distribution of optical transmittances of wavelength bands $W_1, W_2, \ldots$, and $W_N$ included in a target wavelength range. In the example illustrated in FIG. 2B, different shades of areas indicate differences in transmittance. Paler areas have higher transmittances, and thicker areas have lower transmittances. As illustrated in FIG. 2B, the spatial distribution of optical transmittances differs depending on a wavelength band.

Figure 2C:
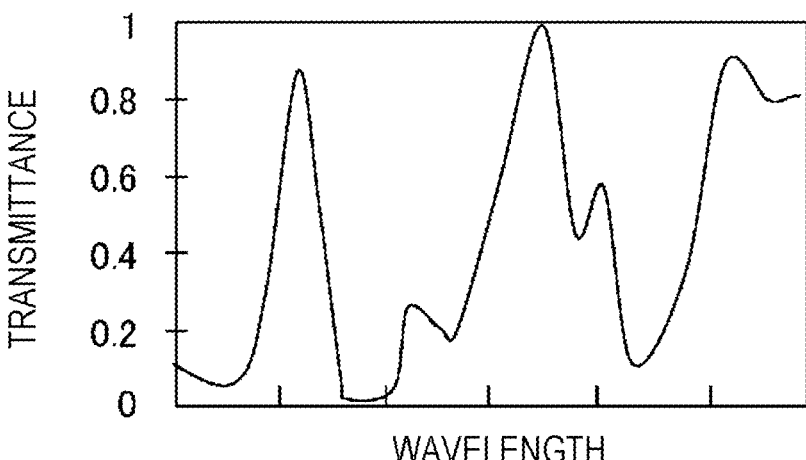
FIG. 2C is a diagram illustrating an example of a spectral transmittance of an area A1 included in the filter array illustrated in FIG. 2A.
Figure 2D:
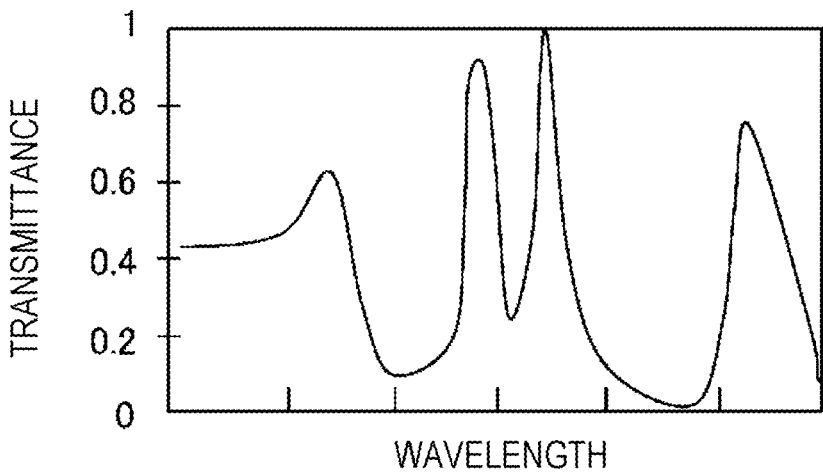
FIG. 2D is a diagram illustrating an example of a spectral transmittance of an area A2 included in the filter array illustrated in FIG. 2A.

FIGS. 2C and 2D are diagrams illustrating an example of spectral transmittances of areas A1 and A2, respectively, included in the filter array 110 illustrated in FIG. 2A. The spectral transmittances of the areas A1 and A2 are different from each other. Spectral transmittances of the filter array 110 are thus different between the areas. The spectral transmittances, however, need not be different between all the areas. The filter array 110 has different spectral transmittances in at least some of the areas. The filter array 110 includes two or more filters whose spectral transmittances are different from each other. In an example, the number of patterns of the spectral transmittances of the areas included in the filter array 110 may be equal to or larger than the number N of wavelength bands included in the target wavelength range. The filter array 110 may be designed such that the spectral transmittances of half the areas or more than half the areas are different from one another.

Figure 3A:
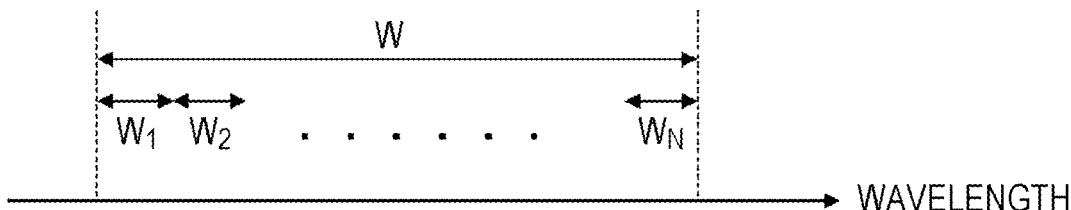
FIG. 3A is a diagram illustrating an example of a relationship between the target wavelength range W and the wavelength bands $W_1$, $W_2$, . . . , and $W_N$ included in the target wavelength range W.
Figure 3B:
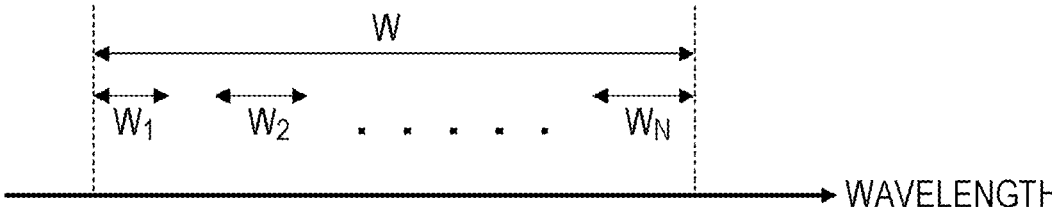
FIG. 3B is a diagram illustrating another example of the relationship between the target wavelength range W and the wavelength bands $W_1$, $W_2$, . . . , and $W_N$ included in the target wavelength range W.

FIGS. 3A and 3B are diagrams illustrating a relationship between a target wavelength range W and wavelength bands $W_1, W_2, \ldots$, and $W_N$ included in the target wavelength range W. The target wavelength range W may be set as one of various ranges in accordance with a purpose. The target wavelength range W may be, for example, a visible light wavelength range of about 400 nm to about 700 nm, a near-infrared wavelength range of about 700 nm to about 2,500 nm, or a near-ultraviolet wavelength range of about 10 nm to about 400 nm. Alternatively, the target wavelength range W may be a mid-infrared or far-infrared wavelength range. A wavelength range used is thus not limited to the visible light range. Not only visible light but also radiation in general including infrared light and ultrared light will be referred to as "light" herein.

In the example illustrated in FIG. 3A, wavelength ranges obtained by dividing the target wavelength range W into N, which is an integer larger than or equal to 4, are determined as the wavelength bands $W_1, W_2, \ldots$, and $W_N$. The wavelength bands, however, are not limited to this example. The wavelength bands included in the target wavelength range W may be set as desired. For example, bandwidth may be different between wavelength bands. Gaps or overlaps may be provided between adjacent bands. In the example illustrated in FIG. 3B, bandwidth is different between the wavelength bands, and gaps are provided between two adjacent wavelength bands. The wavelength bands may thus be set as desired.

Figure 4A:
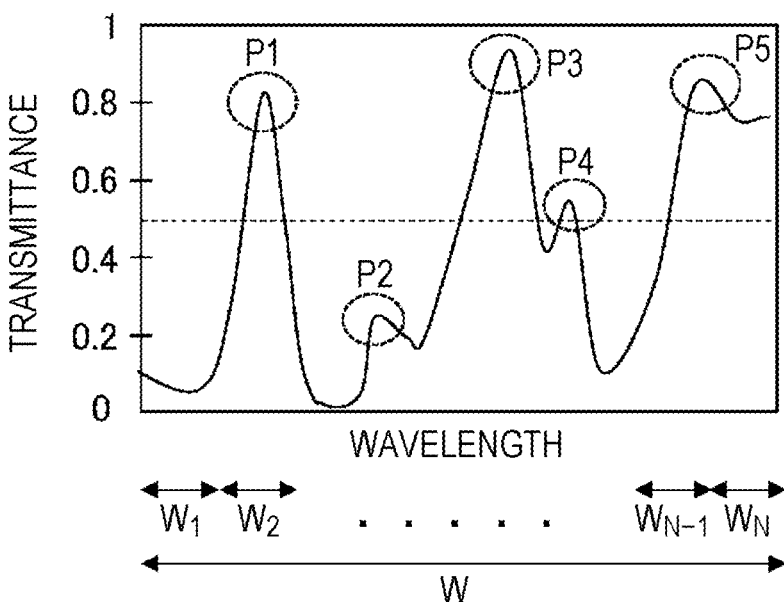
FIG. 4A is a diagram illustrating a spectral transmittance characteristic in a certain area of the filter array.

FIG. 4A is a diagram illustrating a spectral transmittance characteristic in a certain area of the filter array 110. In the example illustrated in FIG. 4A, spectral transmittance has maxima P1 to P5 and minima with respect to wavelengths in the target wavelength range W. In the example illustrated in FIG. 4A, normalization has been performed such that the largest value and the smallest value of optical transmittance within the target wavelength range W become 1 and 0, respectively. In the example illustrated in FIG. 4A, spectral transmittance has maxima in wavelength ranges such as the wavelength band W2 and the wavelength band $W_N-1$. The spectral transmittance of each area may thus be designed in such a way as to have maxima in at least two of the wavelength bands $W_1$ to $W_N$. In the example illustrated in FIG. 4A, the maxima P1, P3, P4, and P5 are 0.5 or larger.

The optical transmittance of each area is thus different depending on the wavelength. The filter array 110, therefore, transmits much of components of incident light in some wavelength ranges and does not transmit components of the incident light in other wavelength ranges as much. For example, transmittance for light in k wavelength bands among the N wavelength bands may be higher than 0.5, whereas transmittance for light in other (N–k) wavelength ranges may be lower than 0.5. k is an integer that satisfies $2 \leq k < N$. When incident light is white light evenly including all wavelength components of visible light, the filter array 110 modulates, in each area, the incident light into light having discrete intensity peaks with respect to wavelength and superimposes and outputs these multiwavelength light beams.

Figure 4B:
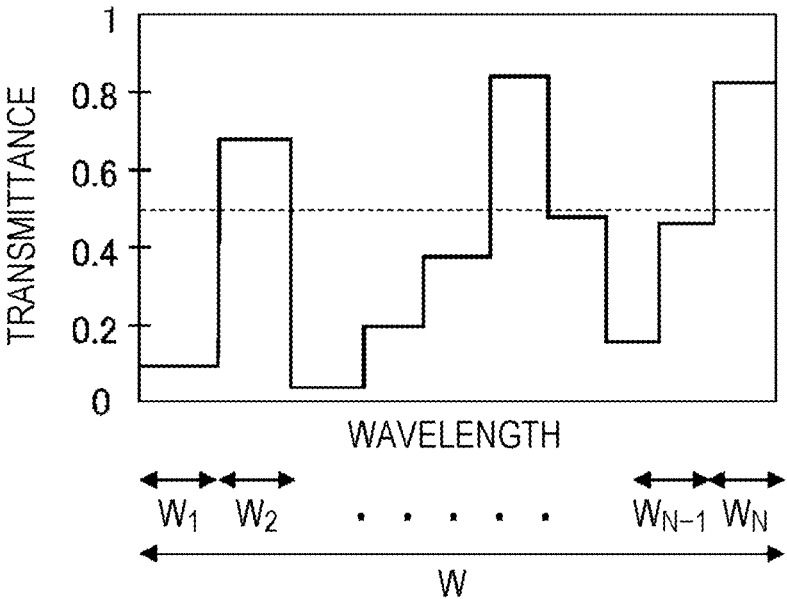
FIG. 4B is a diagram illustrating a result of averaging of spectral transmittances illustrated in FIG. 4A with respect to the wavelength bands $W_1$, $W_2$, . . . , and $W_N$.

FIG. 4B is a diagram illustrating a result of averaging of spectral transmittances illustrated in FIG. 4A, for example, with respect to the wavelength bands $W_1, W_2, \ldots$, and $W_N$. An averaged transmittance is obtained by integrating the spectral transmittance $T(\lambda)$ in each wavelength band and dividing the integrated spectral transmittance $T(\lambda)$ by bandwidth of the wavelength band. An average transmittance in each wavelength band is thus determined as a transmittance in the wavelength band herein. In this example, transmittance is outstandingly high in three wavelength ranges where the maxima P1, P3, and P5 are observed. Especially in two wavelength ranges where the maxima P3 and P5 are observed, transmittance exceeds 0.8.

In the examples illustrated in FIGS. 2A to 2D, grayscale transmittance distribution where transmittance of each area ranges from 0 to 1 is assumed. Grayscale transmittance distribution, however, need not necessarily be assumed. For example, binary-scale transmittance distribution may be employed, where transmittance of each area is either substantially 0 or substantially 1. In binary-scale transmittance distribution, most of light in at least two of wavelength ranges included in a target wavelength range is transmitted in each area, and most of light in other wavelength ranges is not transmitted. "Most" here refers to approximately 80% or higher.

A subset of all cells, namely half the cells, for example, may be replaced by transparent areas. Transparent areas transmit light in all the wavelength bands $W_1$ to $W_N$ included in the target wavelength range W with similarly high transmittances of, say, 80% or more. With this configuration, the transparent areas may be arranged in, for example, a checkerboard pattern. That is, areas where optical transmittance is different depending on the wavelength and transparent areas may be alternately arranged in two arrangement directions of the areas of the filter array 110.

Data indicating spatial distribution of spectral transmittances of the filter array 110 is obtained in advance on the basis of design data or actual measurement calibration and stored in the storage medium included in the image processing device 200. The data is used for arithmetic processing, which will be described later.

The filter array 110 may be achieved, for example, using a multilayer film, an organic material, a diffraction grating structure, or a microstructure containing a metal. When a multilayer film is used, for example, a multilayer film including a dielectric multilayer film or a metal film is used. In this case, the multilayer film is formed such that at least thickness, material, or order of stacking layers becomes different between cells. As a result, spectral characteristics different between cells can be achieved. By using a multilayer film, sharp rises and falls can be achieved in spectral transmittance. A multilayer film may be used in order to achieve not sharp rises and falls in spectral transmittance but various spectral transmittances, instead. A configuration employing an organic material may be achieved by using different pigments or dyes between cells or stacking layers of different materials. A configuration having a diffraction grating structure may be achieved by providing a diffraction grating structure where diffraction pitches or depths are different between cells. When a microstructure containing a metal is used, the filter array 110 may be fabricated through spectroscopy based on plasmonic effects.

Next, an example of signal processing performed by the image processing device 200. The image processing device 200 reconstructs multiwavelength hyperspectral images 20 on the basis of a compressed image 10 output from the image sensor 160 and spatial distribution characteristics of transmittances of the filter array 110 by wavelength. Multiwavelength herein refers to wavelength ranges more than those of three colors of RGB obtained by, for example, a common color camera. The number of wavelength ranges may be, for example, about 4 to 100. The number of wavelength ranges will be referred to as the "number of bands". The number of bands may exceed 100 depending on the purpose.

Data to be obtained is data regarding hyper spectral images 20 and will be denoted by f. When the number of bands is denoted by N, f is data obtained by integrating image data $f_1$, $f_2$, . . . , and $f_N$ regarding the bands. It is assumed here that, as illustrated in FIG. 1A, a horizontal direction of an image is an x direction and a vertical direction of an image is a y direction. Each piece of the image data $f_1$, $f_2$, . . . , and $f_N$ is two-dimensional data regarding n×m pixels, where m and n denote the number of pixels in the x and y directions of image data to be obtained, respectively. The data f, therefore, is three-dimensional data whose number of elements is n×m×N. The three-dimensional data will be referred to as "hyperspectral image data" or an "HS data cube". The number of elements of data g regarding the compressed image 10 obtained through coding and multiplexing performed by the filter array 110, on the other hand, is n×m. The data g can be represented by the following expression (1).

$$g = Hf = H \begin{bmatrix} f_1 \\ f_2 \\ \vdots \\ f_N \end{bmatrix} \tag{1}$$

Here, each of $f_1$, $f_2$, . . . , and $f_N$ is data including n×m elements. To be exact, therefore, a right-hand side vector is a one-dimensional vector of n×m×N rows and one column.

The vector g is transformed into and represented as a one-dimensional vector of n×m rows and one column and calculated. A matrix H denotes a transform where each of the components $f_1$, $f_2$, . . . , and $f_N$ of the vector f is coded and intensity-modulated with different coding information (hereinafter also referred to as "mask information") for each wavelength band and added up. H, therefore, is a matrix of n×m rows and n×m×N columns.

When the vector g and the matrix H are given, it seems that f can be obtained by solving an inverse problem of expression (1). Since the number of elements n×m×N of the data f to be obtained is larger than the number of elements n×m of the obtained data g, however, this problem is an ill-posed problem and cannot be solved as is. The image processing device 200, therefore, finds a solution using a method of compressed sensing using redundancy of images included in the data f. More specifically, the data f to be obtained is estimated by solving the following expression (2).

$$f' = \operatorname*{argmin}_{f} \left\{ \|g - Hf\|_{l_2} + \tau\Phi(f) \right\} \tag{2}$$

Here, f denotes the estimated data f. A first term in parentheses in the above expression represents a difference between an estimated result Hf and the obtained data g, that is, a so-called residual term. Although the sum of squares is used as the residual term here, an absolute value or a square root of the sum of squares, for example, may be used as the residual term, instead. A second term in the parentheses is a regularization term or a stabilization term. Equation (2) means finding an f that minimizes the sum of the first and second terms. A function in the parentheses in equation (2) will be referred to as an evaluation function. The image processing device 200 can converge a solution through recursive iterative operations and calculate the f that minimizes the evaluation function as a final solution f'.

The first term in the parentheses in equation (2) refers to an operation for finding the sum of squares of a difference between the obtained data g and Hf, which is obtained by transforming f in the estimation process with the matrix H. $\Phi(f)$ in the second term is a constraint in regularization of f and is a function reflecting sparsity information regarding the estimated data. This function has an effect of smoothing or stabilizing the estimated data. The regularization term can be represented, for example, by a DCT, a wavelet transform, a Fourier transform, or TV of f. When TV is used, for example, stable estimated data can be obtained with a minimal effect of noise in the observed data g. The sparsity of the object 70 in a space of each regularization term depends on texture of the object 70. A regularization term with which the texture of the object 70 becomes sparser in the space of the regularization term may be selected. Alternatively, different regularization terms may be included in the operation. τ is a weight coefficient. The larger the weight coefficient τ, the larger the amount of redundant data reduced and the higher the compression ratio. The smaller the weight coefficient τ, the weaker the convergence to the solution. The weight coefficient τ is set at a moderate value that allows f to converge to some extent and that does not result in over-compression.

With the configurations illustrated in FIGS. 1B and 1C, an image coded by the filter array 110 is obtained on the imaging surface of the image sensor 160 in a blurred state. The hyperspectral images 20, therefore, can be reconstructed by keeping this blur information in advance and reflecting the blur information in the matrix H. Here, the blur information is represented by a point spread function (PSF). The PSF is a function that specifies a degree of spread of a point source to surrounding pixels. When a point source corresponding to one pixel in an image spreads over an area of k×k pixels around the pixel due to blurring, for example, the PSF can be specified as a set of coefficients, that is, a matrix, that indicates an effect of the pixel upon a pixel value of each pixel in the area. The hyper spectral images 20 can be reconstructed by reflecting an effect of blurring, which is specified by the PSF, upon a coding pattern in the matrix H. The filter array 110 may be disposed at any position, but a position where the coding pattern of the filter array 110 is not too diffuse and lost may be selected.

As a result of the above process, hyper spectral images 20 can be reconstructed from a compressed image 10 obtained by the image sensor 160.

2. Inspection System

Next, an example of an inspection system that employs the above imaging system will be described.

Figure 5:
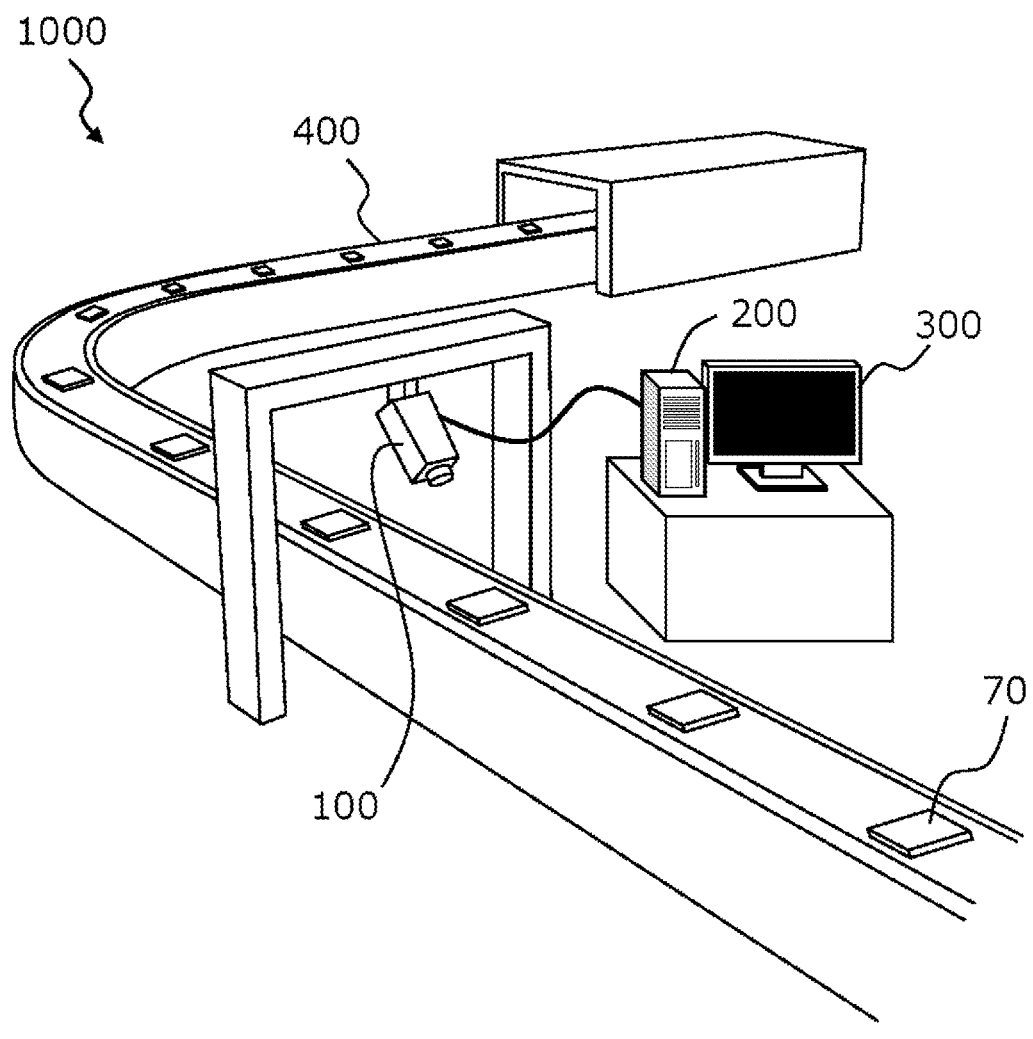
FIG. 5 is a diagram schematically illustrating an example of the configuration of an inspection system.

FIG. 5 is a diagram schematically illustrating an example of the configuration of an inspection system 1000. The inspection system 1000 includes the imaging device 100, the image processing device 200, a display device 300, and a conveyor 400. The display device 300 in the example illustrated in FIG. 5 is a display. A device such as a speaker or a lamp may be provided instead of, or in addition to, the display. The conveyor 400 is a belt conveyor. A picking device that removes abnormal objects 70 may be provided in addition to the belt conveyor.

Objects 70 to be inspected are put on a belt of the conveyor 400 and conveyed. The objects 70 are, for example, any articles such as industrial products or food products. The inspection system 1000 obtains hyperspectral images of the objects 70 and determines normality of the objects 70 on the basis of image information regarding the hyperspectral images. For example, the inspection system 1000 detects presence or absence of foreign objects mixed into the objects 70. Foreign objects to be detected may be, for example, any objects including certain metals, plastic, bugs, dusts, and hair. Foreign objects are not limited to these objects, and may be deteriorated parts of the objects 70. When the objects 70 are food products, for example, rotten parts of the food products may be detected as foreign objects. Upon detecting a foreign object, the inspection system 1000 can output, to the display device 300 or an output device such as a speaker, information indicating the detection of the foreign object or remove an objects 70 including the foreign object with a picking device.

The imaging device 100 is a camera capable of the above-described hyperspectral imaging. The imaging device 100 generates the above-described compressed images by capturing images of the objects 70 continuously conveyed on the conveyor 400. The image processing device 200 may be, for example, any computer such as a personal computer, a server computer, or a laptop computer. The image processing device 200 can generate a reconstructed image for each of wavelength bands by performing a reconstruction process based on the above expression (2) on the basis of a compressed image generated by the imaging device 100. The image processing device 200 can determine normality of an object 70 (e.g., presence or absence of foreign objects or abnormalities) on the basis of the reconstructed images and output a result of the determination to the display device 300.

The configuration of the inspection system 1000 illustrated in FIG. 5 is just an example. The imaging system is not limited to inspection and may be used for any purpose where spectral information regarding objects is obtained. The imaging system may be implemented, for example, in a mobile terminal such as a smartphone or a tablet computer. The same functions as those of the imaging system may be achieved by combining a camera and a processor built in a smartphone or a tablet computer and an attachment including a filter array that functions as an encoding mask.

3. Estimation of Reconstruction Error

Next, an example of a configuration and an operation for estimating an error in reconstructed images will be described. A method for estimating an error that will be described hereinafter is just an example and may be modified in various ways.

3-1. Estimation of Error Based on Evaluation Function

Figure 6:
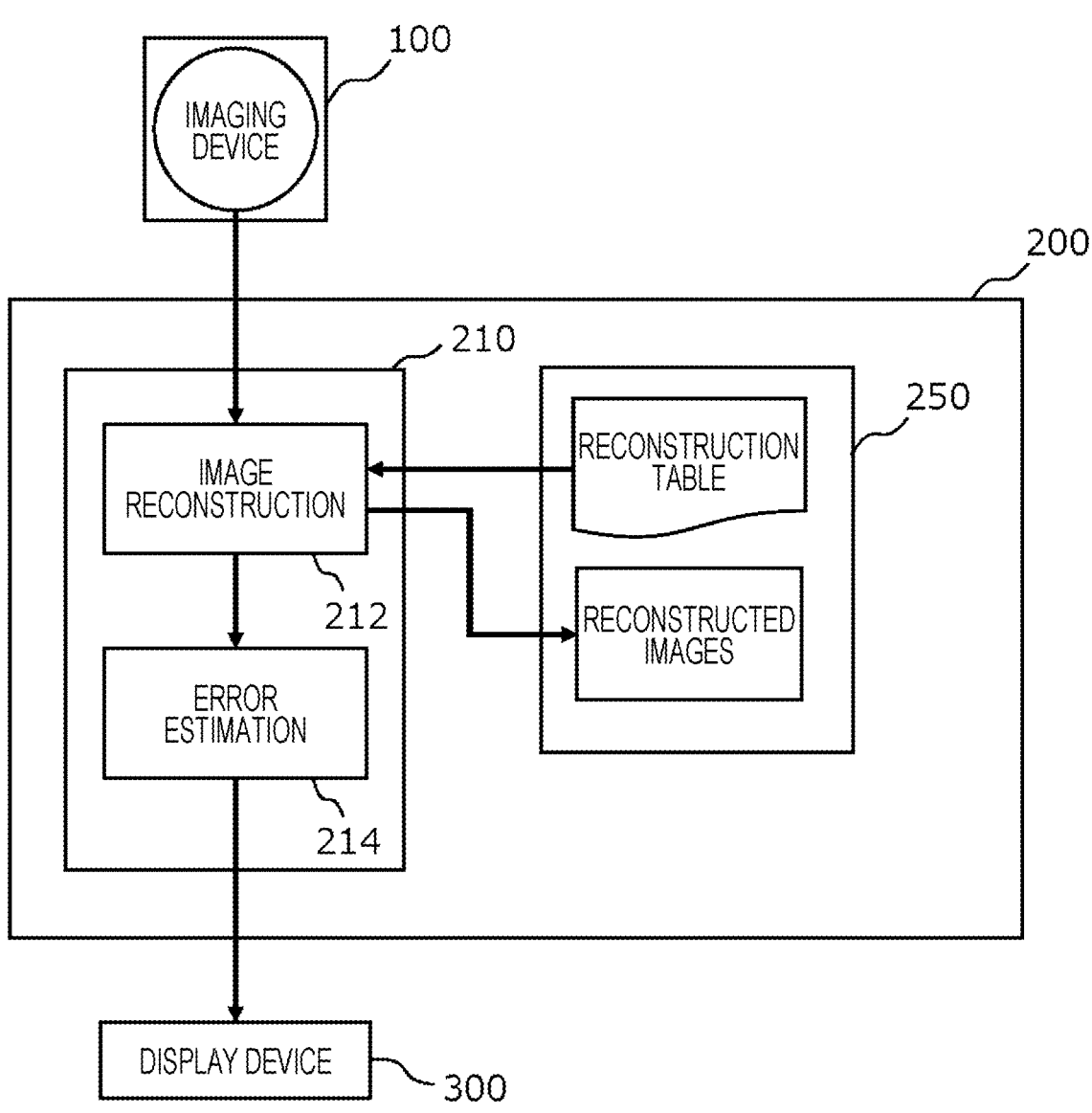
FIG. 6 is a diagram illustrating an example of the configuration of an image processing apparatus that generates a reconstructed image for each wavelength band and that estimates an error in the reconstructed image.

FIG. 6 is a diagram illustrating an example of the configuration of the image processing device 200 that generates a reconstructed image for each wavelength band and that estimates an error in the reconstructed image. The image processing device 200 is connected to the imaging device 100 and the display device 300 and used. The image processing device 200 includes a signal processing circuit 210 and a storage device 250. The signal processing circuit 210 includes an image reconstruction module 212, and an error estimation module 214. The image reconstruction module 212 generates reconstructed images by performing an operation (e.g., an operation indicated by the above expression (2)) based on a compressed image generated by the imaging device 100. The error estimation module 214 estimates an error in the reconstructed images and outputs a signal indicating a result of the estimation. The signal indicating the result of the estimation is transmitted to the display device 300. The display device 300 displays information indicating the estimated error.

The signal processing circuit 210 includes one or more processors. The signal processing circuit 210 may separately include a processor that functions as the image reconstruction module 212 and a processor that functions as the error estimation module 214. Alternatively, the signal processing circuit 210 may include one processor having functions of both the image reconstruction module 212 and the error estimation module 214. The signal processing circuit 210 may achieve the functions of the image reconstruction module 212 and the error estimation module 214 by executing a computer program stored in the storage device 250.

The storage device 250 includes one or more storage media. Each of the storage media may be, for example, any storage medium such as a semiconductor memory, a magnetic storage medium, or an optical storage medium. The storage device 250 stores in advance a reconstruction table indicating light transmission characteristics of the filter array 110 included in the imaging device 100. The reconstruction table is an example of coding information indicating light transmission characteristics of the filter array 110 that functions as an encoding mask. The reconstruction table may be, for example, data in a table format indicating the matrix H in expression (2). The storage device 250 stores data regarding reconstructed images generated by the image reconstruction module 212. Although not illustrated in FIG. 6, the storage device 250 also stores data regarding compressed images generated by the imaging device 100 and computer programs to be executed by the signal processing circuit 210. These pieces of data may be distributed to different storage media and stored.

Figure 7:
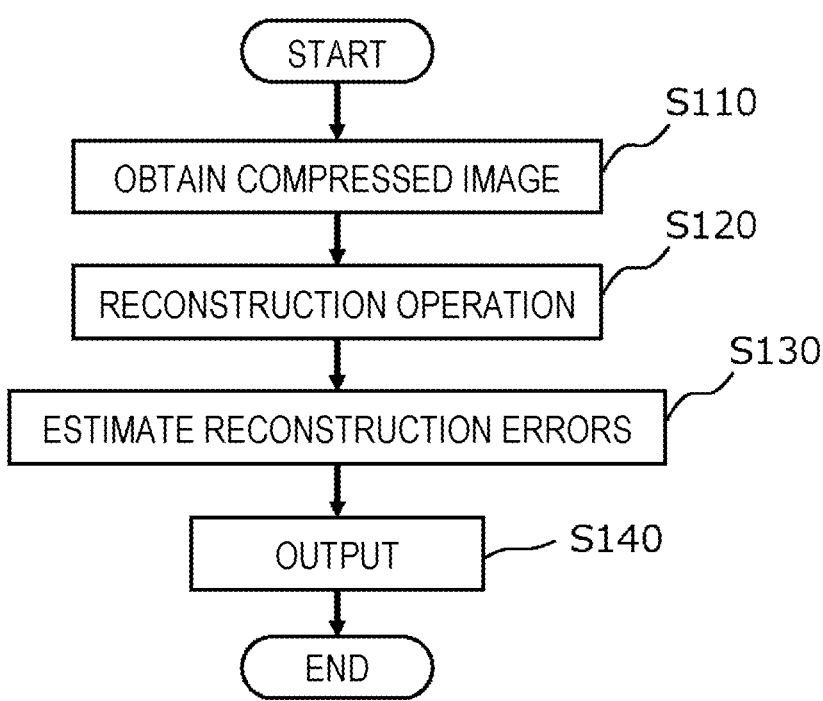
FIG. 7 is a flowchart illustrating an example of an operation of a signal processing circuit.

FIG. 7 is a flowchart illustrating an example of an operation of the signal processing circuit 210. In this example, first, the image reconstruction module 212 of the signal processing circuit 210 obtains a compressed image generated by the imaging device 100 (step S110). The signal processing circuit 210 may obtain a compressed image directly from the imaging device 100 or through the storage device 250. Next, the image reconstruction module 212 performs a reconstruction process based on the compressed image and the reconstruction table stored in the storage device 250 and generates reconstructed images (step S120). The reconstruction process may be, for example, a process including the operation indicated by the above expression (2). The image reconstruction module 212 can generate an f that minimizes the evaluation function in the parentheses in expression (2) as a vector indicating reconstructed images through recursive iterative operations. Next, the error estimation module 214 of the signal processing circuit 210 estimates an error in the reconstructed images (step S130) and outputs a signal indicating the estimated error (hereinafter referred to as a "reconstruction error") (step S140). At this time, the signal indicating the reconstructed images may also be output. The error estimation module 214 estimates the reconstruction error on the basis of the compressed image, the reconstructed images, and the reconstruction table (i.e., coding information). For example, the reconstruction error can be estimated on the basis of a value of the evaluation function calculated on the basis of the compressed image, the reconstructed images, and the reconstruction table. The evaluation function may be, for example, the function in the parentheses in the above expression (2). The signal processing circuit 210 can estimate the reconstruction error on the basis of the value of the evaluation function with which the solution of the vector f indicating the reconstructed images converges, that is, the value of the evaluation function with which the evaluation function becomes minimum. The evaluation function is not limited to the function in the parentheses in the above expression (2) and may differ depending on the configuration of the system. As in a system disclosed in Japanese Patent No. 6672070, the technique in the present embodiment may be applied to a system that reconstructs high-resolution images on the basis of an image obtained by combining together images obtained under different imaging conditions. In this case, a function in parentheses in expression (9) of Japanese Patent No. 6672070 may be used as the evaluation function.

When an image of a subject is captured in practice, an error indicating a degree of deviation from a "correct answer" cannot be obtained because it is practically difficult to define the correct answer. A calculation method and an algorithm used and how the evaluation function relates to a reconstruction error, however, can be estimated to some degree. An ideal captured image and a correct image may be prepared in software, for example, and a relationship between the evaluation function and the reconstruction error can be examined on the basis of these images.

An error between a reconstructed image estimated through an operation and a correct image may be represented, for example, by mean squared error (MSE). The MSE is represented by the following expression (3).

$$MSE = \frac{1}{n \cdot m} \sum_{i=1}^{n} \sum_{j=1}^{m} (f_{ij} - I_{ij})^2 \tag{3}$$

Here, n and m denote the number of pixels in vertical and horizontal directions of an image, respectively, $f_{i,j}$ denotes a pixel value in an i-th row and a j-th column of a correct image, and $I_{i,j}$ denotes a pixel value in an i-th row and a j-th column of an estimated reconstructed image. Each image may be, for example, an 8-bit image where a value of each of pixels is expressed by an 8-bit value (0 to 255). An error may be represented by another error evaluation index such as root MSE (RMSE), peak-signal-to-noise-ratio (PSNR), or a mean absolute error (MAE) instead of the MSE.

In sparse reconstruction, data can be reconstructed by solving a minimization problem for an evaluation function as in the above expression (2) or expression (9) of Japanese Patent No. 6672070. A reason why this method is used is that most of subjects in nature have sparsity. With subjects with sparsity, a regularization term such as a DCT, a wavelet transform, a Fourier transform, or TV becomes small. In a reconstruction process based on sparsity, how accurately a minimization problem is solved is one of factors that determine a reconstruction error, and there is a strong correlation between an evaluation function used in the minimization problem and the reconstruction error. The error, therefore, can be estimated on the basis of a value of the evaluation function.

Figure 8:
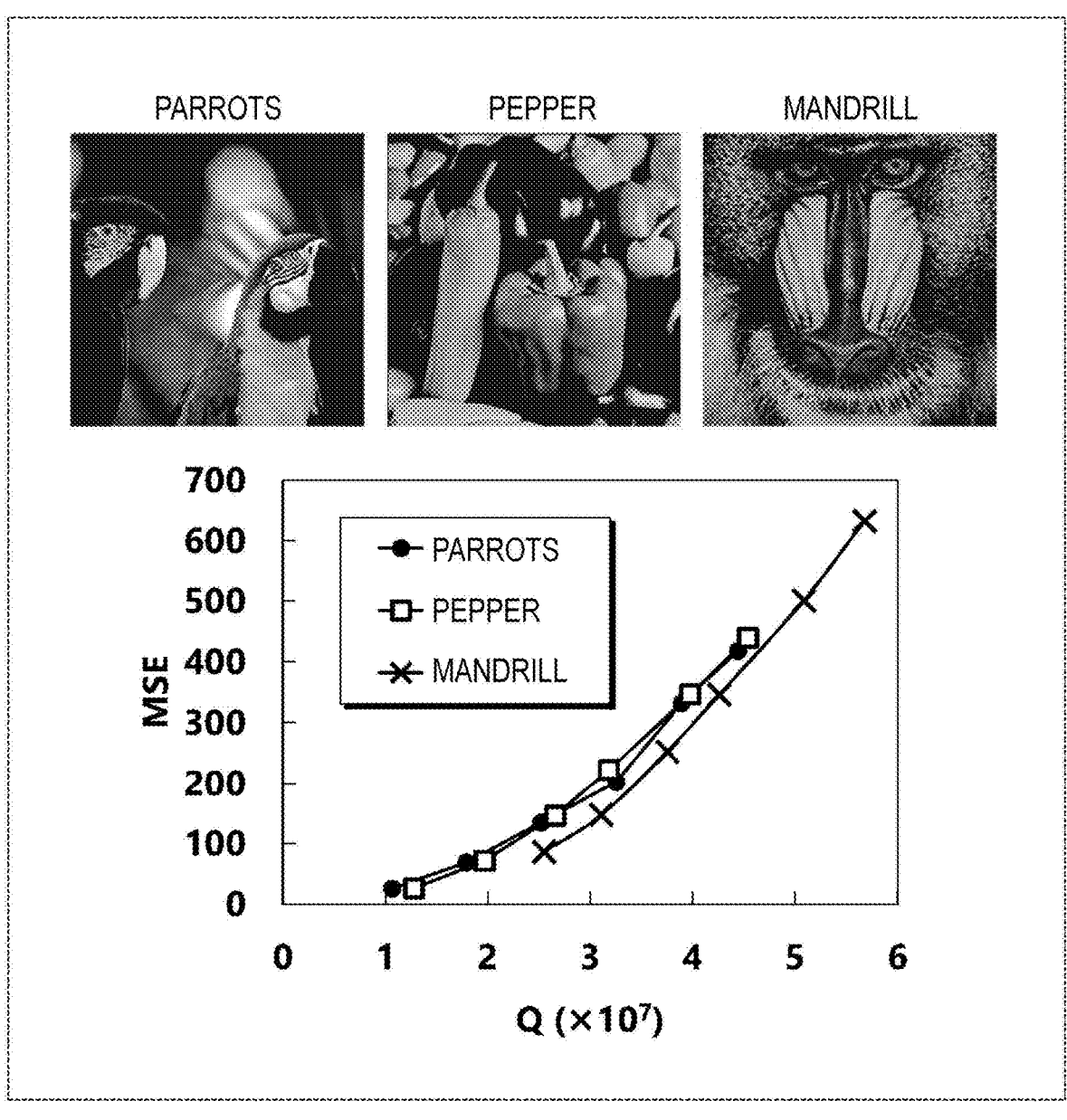
FIG. 8 is a diagram illustrating an example of relationships between values of an evaluation function and a reconstruction error for three different subjects.

FIG. 8 is a diagram illustrating an example of relationships between values of an evaluation function and a reconstruction error for three different subjects. In this example, the reconstruction operation indicated by the above expression (2) was performed for the three subjects illustrated in FIG. 8 with the number of wavelength bands set at 10. The function in the parentheses in expression (2) was determined as an evaluation function Q, and TV was employed as a regularization term. A graph of FIG. 8 indicates a relationship between the evaluation function Q and the MSE indicating an error between reconstructed images and a correct image for each subject. Although the relationship between the evaluation function Q and the MSE is different depending on the subject, the MSE can be uniquely determined for any subject once Q is uniquely determined.

An error such as MSE, therefore, can be obtained from the evaluation function Q on the basis of data regarding a function such as that indicated by the graph of FIG. 8 or a table when the data is stored in advance. When there are types of subjects to be inspected, data regarding a table, a function, or the like specifying a relationship between the evaluation function Q and a reconstruction error such as MSE may be stored in the storage device 250 in advance for each of assumed subjects. The signal processing circuit 210 can obtain an error in reconstructed images from values of the evaluation function Q on the basis of the data. The signal processing circuit 210 may represent an error with an error evaluation index such as MSE, or with a symbol such as A, B, or C, an indicator such as "high", "moderate", or "low", or text such as "good", "ordinary", or "bad".

Calculation of an evaluation function including a regularization term, such as that indicated by the above expression (2) or expression (9) of Japanese Patent No. 6672070, becomes possible when a compressed image obtained by an imaging device, reconstructed images, and coding information indicating light transmission characteristics of an encoding mask are available. A CNN such as that disclosed in U.S. Patent Application Publication No. 2019/0340497, on the other hand, may also be used. Although this example of the related art does not specify an evaluation function, an evaluation function for evaluating certainty of estimated reconstructed images can be defined on the basis of a compressed image, the reconstructed images, and coding information (e.g., a measurement vector in this example of the related art). In the reconstruction process, an error in the reconstructed images can be obtained from a value of the defined evaluation function.

An error in reconstructed images estimated through the reconstruction process can thus be estimated on the basis of a compressed image obtained through imaging that employs an encoding mask, the reconstructed images, and an evaluation function based on coding information indicating light transmission characteristics of the encoding mask. According to the present embodiment, an error caused in the reconstruction process can be estimated even when spectral data or image data regarding a subject is not obtained in advance.

The signal processing circuit 210 may estimate obtained reconstructed images and an error in the reconstructed images for the entirety of the images or an area in the images. An evaluation function such as that in the above expression (2) is uniquely determined for an obtained image or an area in the image. For this reason, the estimation of a reconstructed image and the estimation of an error may be performed on the basis of, for example, only an area in the obtained image corresponding to a subject to be inspected. Although an error estimated from an evaluation function may include spatial information but does not include wavelength information. In a certain area in an image (i.e., an area including pixels), therefore, the same error is estimated and output for all wavelength bands.

Figure 9:
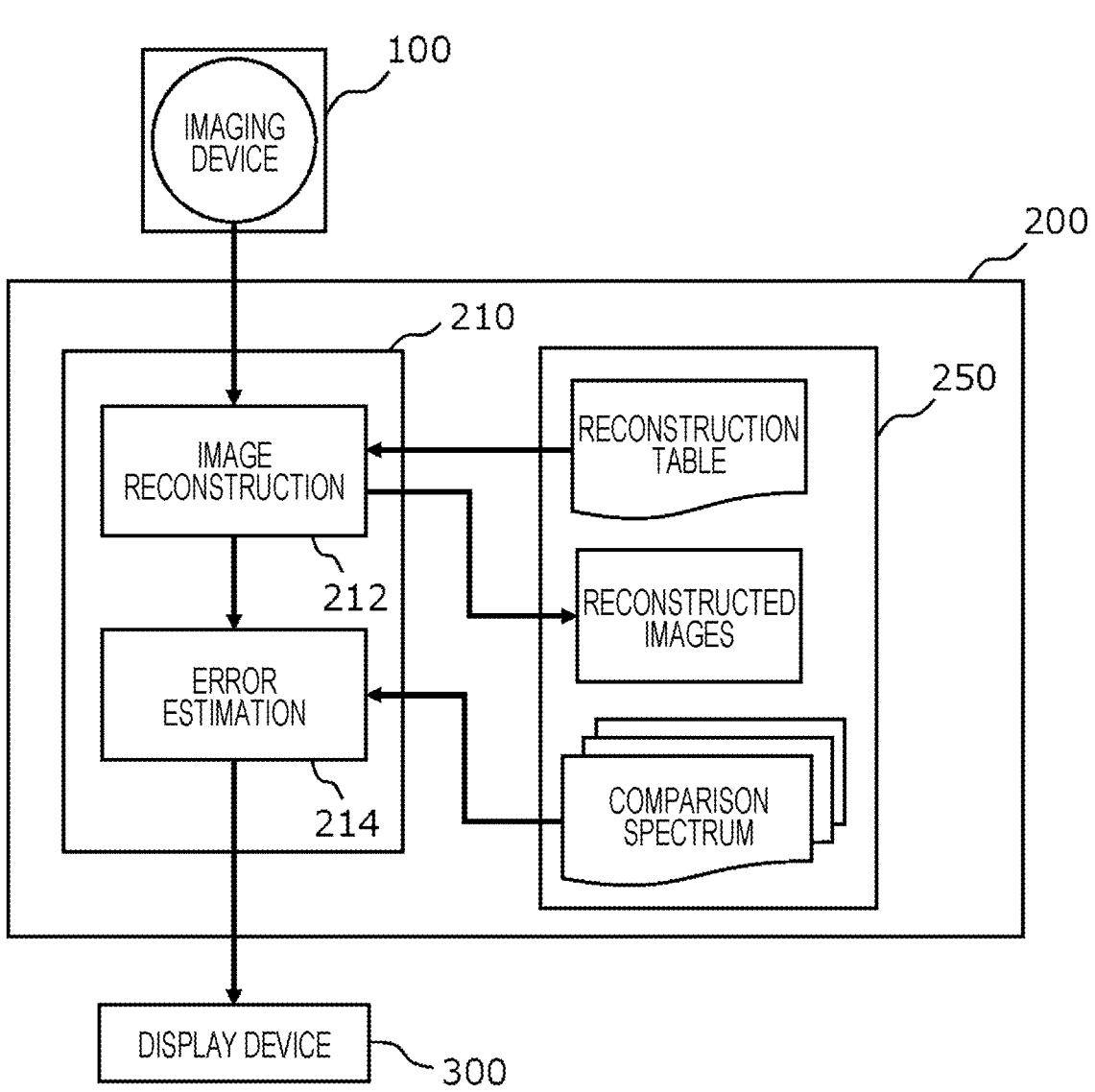
FIG. 9 is a block diagram illustrating another example of the configuration of the image processing apparatus that estimates a reconstruction error.

3-2. Error Estimation Based on Comparison with Known Transmission Characteristics FIG. 9 is a block diagram illustrating another example of the configuration of the image processing device 200 that estimates a reconstruction error. In this example, the imaging device 100 captures an image of a scene including a target subject to be obtained through reconstruction and a reference subject with a known reflection spectrum. The storage device 250 stores reference information (indicated as a "comparison spectrum" in FIG. 9) indicating spectra of reference subjects. The imaging device 100 generates a compressed image by capturing an image of the scene including a target subject and a reference subject using an encoding mask. The signal processing circuit 210 reads, after performing the reconstruction process, a comparison spectra stored in the storage device 250 and estimates an error on the basis of spectra of an area in reconstructed images corresponding to the reference subject and the comparison spectra.

Figure 10:
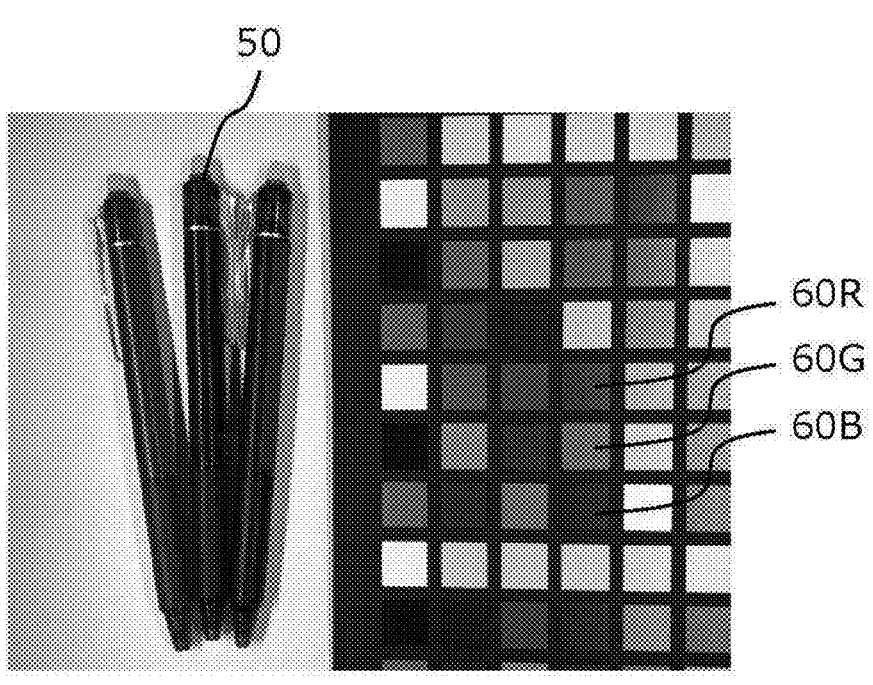
FIG. 10 is a diagram illustrating an example of a scene whose image is captured.

FIG. 10 is a diagram illustrating an example of a scene whose image is captured in the example illustrate in FIG. 9. The target subject in this example is pens 50, and the reference subject includes a red area 60R, a green area 60G, and a blue area 60B in a color chart. The reference subject is not limited to the red area 60R, the green area 60G, and the blue area 60B, and may be any color area(s). As the reference subject, an area of one color or areas of different colors may be selected. Data regarding reflection spectra of one or more areas used as the reference subject is stored in the storage device 250 in advance as comparison spectra. The data regarding reflection spectra may be, for example, data regarding a value of each of wavelength bands included in a predetermined target wavelength range. The signal processing circuit 210 extracts, from reconstructed images, data regarding an area in the reconstructed image corresponding to the reference subject and calculates an error on the basis of differences between values of wavelength bands indicated by the extracted data and values of corresponding wavelength bands in the comparison spectra stored in the storage device 250 in advance. A value obtained by accumulating squares of differences between values of wavelength bands indicated by data regarding an area in the reconstructed images corresponding to the reference subject and values of corresponding wavelength bands in the comparison spectra stored in the storage device 250 in advance, for example, may be determined as an error. When the reference subject includes areas as illustrated in FIG. 10, the sum or an average of values of errors calculated for the areas may be determined as a final value of an error.

Although data regarding comparison spectra is stored in advance as reference information indicating spectra of the reference subject, reference images indicating the reference subject may be stored, instead. The reference images may be color images including RGB color information or images including information regarding four or more wavelength bands. The signal processing circuit 210 can estimate an error on the basis of comparison between a reference image and an area in reconstructed images indicating the reference subject. For example, an error evaluation index, such as MSE, between a reference image and a corresponding area in a reconstructed image may be calculated for each of bands whose information is included in the reference image, and the sum of values of the error evaluation index may be determined as an error.

The reference subject is not limited to a color chart, and may be any object with known spectra. For example, a color sample with known spectra, a whiteboard, a non-transparent article whose spectra have been measured using an instrument such as a spectrophotometer, or the like may be widely used as the reference subject. The color chart, the color samples, the whiteboard, or any other article may be sold together with the imaging device 100, the image processing device 200, or software executed by the image processing device 200. The imaging device 100, the image processing device 200, or the software executed by the image processing device 200 may be sold with the spectra of the reference subject, that is, the comparison spectra, stored in the storage device 250 as factory-calibrated values. Alternatively, the comparison spectra may be stored in the storage device 250 as a result of measurement performed by a user at a time of initial activation.

Figure 11:
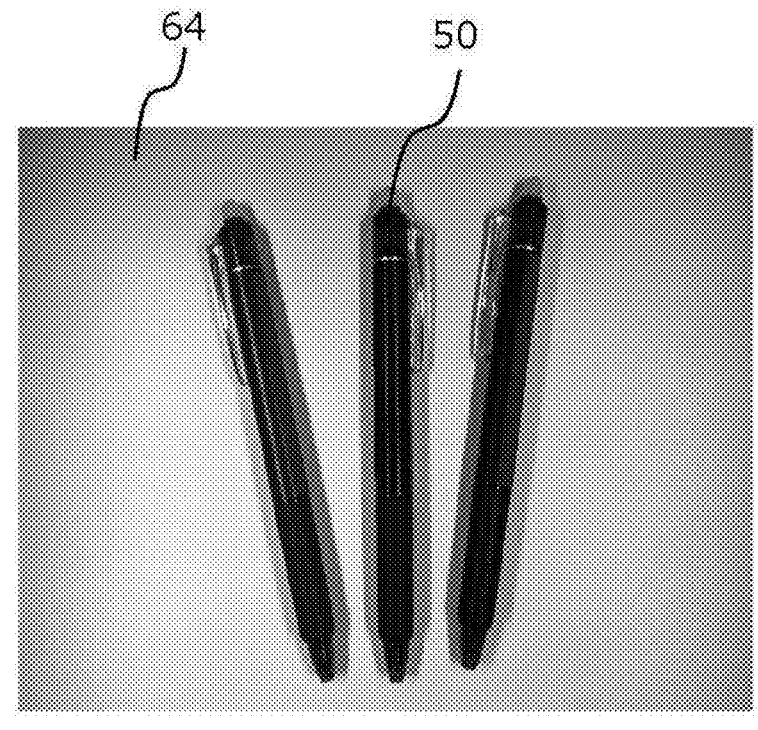
FIG. 11 is a diagram illustrating another example of the scene whose image is captured.

In addition, as illustrated in FIG. 11, a similar process may be performed with a background 64 determined as the reference subject. In this case, a reflection spectrum of the background 64 is measured and stored in advance. The signal processing circuit 210 estimates an error in reconstructed images using spectral information regarding the background in the reconstruction process.

An error may be estimated using a reference subject whose spatial frequencies, not spectra, are known. In this case, the storage device 250 stores reference information indicating the spatial frequencies of the reference subject. The signal processing circuit 210 estimates an error on the basis of differences between spatial frequencies in an area in reconstructed images corresponding to the reference subject and the spatial frequencies indicated by the reference information.

Figure 12:
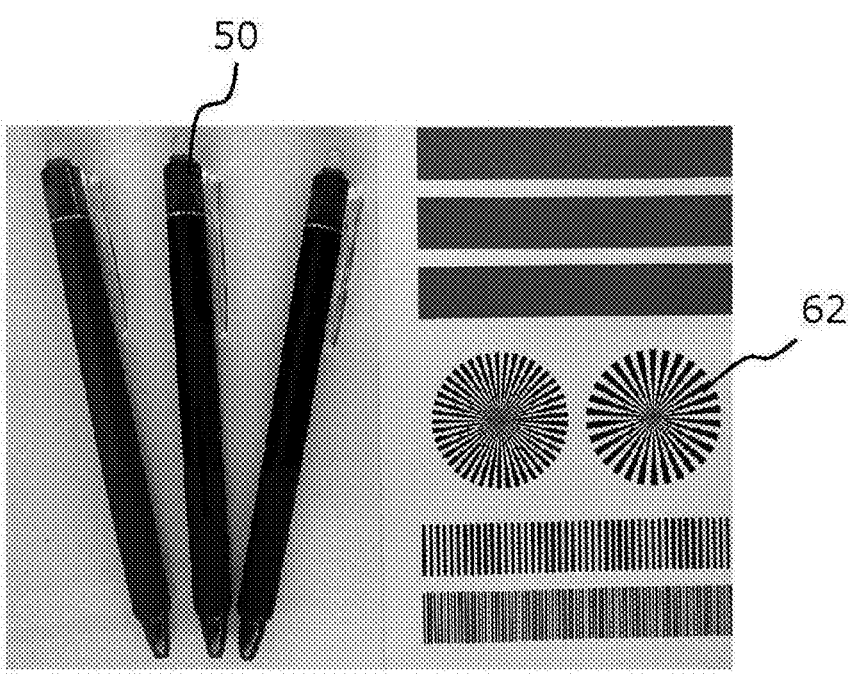
FIG. 12 is a diagram illustrating yet another example of the scene whose image is captured.

FIG. 12 is a diagram illustrating an example of a scene whose image is captured when an error is estimated on the basis of differences in spatial frequency between images. In this example, the imaging device 100 simultaneously captures images of the pens 50, which are the target subject, and a resolving power chart 62, which is the reference subject. Spatial frequencies of the resolving power chart 62 are known, and reference information indicating the spatial frequencies is stored in the storage device 250 in advance.

The reference information stored in this case may include, for example, one or more spatial frequencies in at least a horizontal direction or a vertical direction of a reference image indicating the resolving power chart. The one or more spatial frequencies may be obtained, for example, by performing a transform, such as a fast Fourier transform, on the reference image. The signal processing circuit 210 extracts, from reconstructed images, an area corresponding to the reference subject and performs a transform, such as a fast Fourier transform, on the extracted area. As a result, one or more spatial frequencies can be obtained from the reconstructed images in at least a horizontal direction or a vertical direction. The signal processing circuit 210 can estimate an error on the basis of differences between the one or more spatial frequencies of the reference image and the one or more spatial frequencies of the area in the reconstructed images corresponding to the reference subject. The signal processing circuit 210 may estimate an error on the basis of comparison between a calculated value of a modulation transfer function (MTF) of the reference image and calculated values of the MTF of the area in the reconstructed images corresponding to the reference subject.

Figure 13:
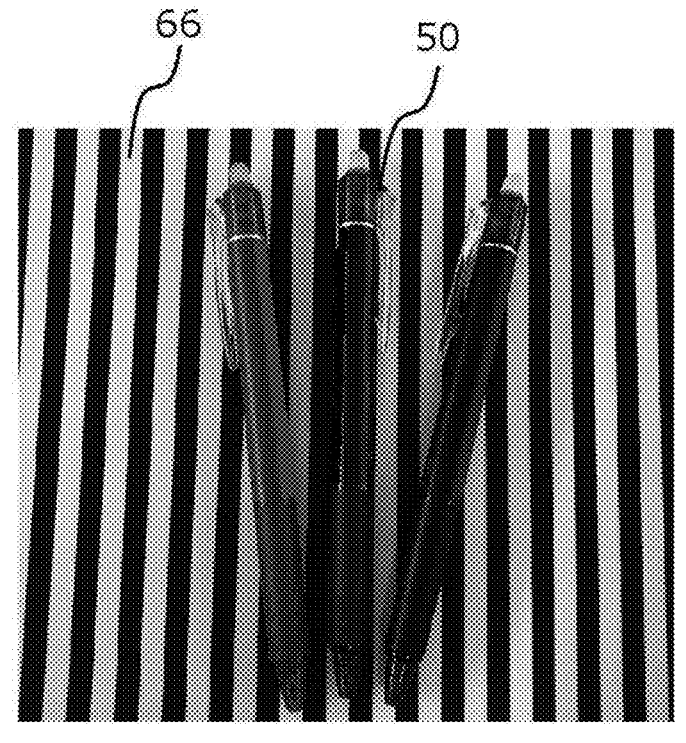
FIG. 13 is a diagram illustrating yet another example of the scene whose image is captured.

FIG. 13 is a diagram illustrating another example of the scene whose image is captured when an error is estimated on the basis of differences in spatial frequency between images. In this example, a background 66 with a known spatial frequency is used as a reference subject. The background 66 illustrated in FIG. 13 has a stripe pattern with a constant spatial frequency in a horizontal direction. In this case, the signal processing circuit 210 estimates a reconstruction error on the basis of differences between spatial frequencies of an area in reconstructed images corresponding to the background 66 in the horizontal direction and a spatial frequency of a prepared reference image in the horizontal direction. In this case, too, the signal processing circuit 210 can estimate an error on the basis of a calculated value of the MFT or FFT of the reference image indicating the known background 66 and calculated values of the MTF or FFT of the area in the reconstructed images corresponding to the background 66.

In each of the above examples, an article or a background whose spectra or spatial frequencies are known (i.e., the reference subject) may be constantly disposed or displayed in an imaging area, or may be disposed or displayed at certain time intervals or as necessary. For example, images of the reference subject and the target subject may be simultaneously captured only when a regular maintenance or calibration operation is performed once a day or a week, in order to check whether a reconstruction error has been caused. A reconstruction error might be caused due to aging or failure of the imaging device 100. Whether the imaging device 100 has aged or failed, therefore, can be checked by performing the process for estimating a reconstruction error during maintenance or calibration.

4. Examples of how Reconstruction Error is Displayed

Next, some examples of how a reconstruction error is displayed will be described.

4-1. Warning when Error Exceeds Threshold

Figure 14:
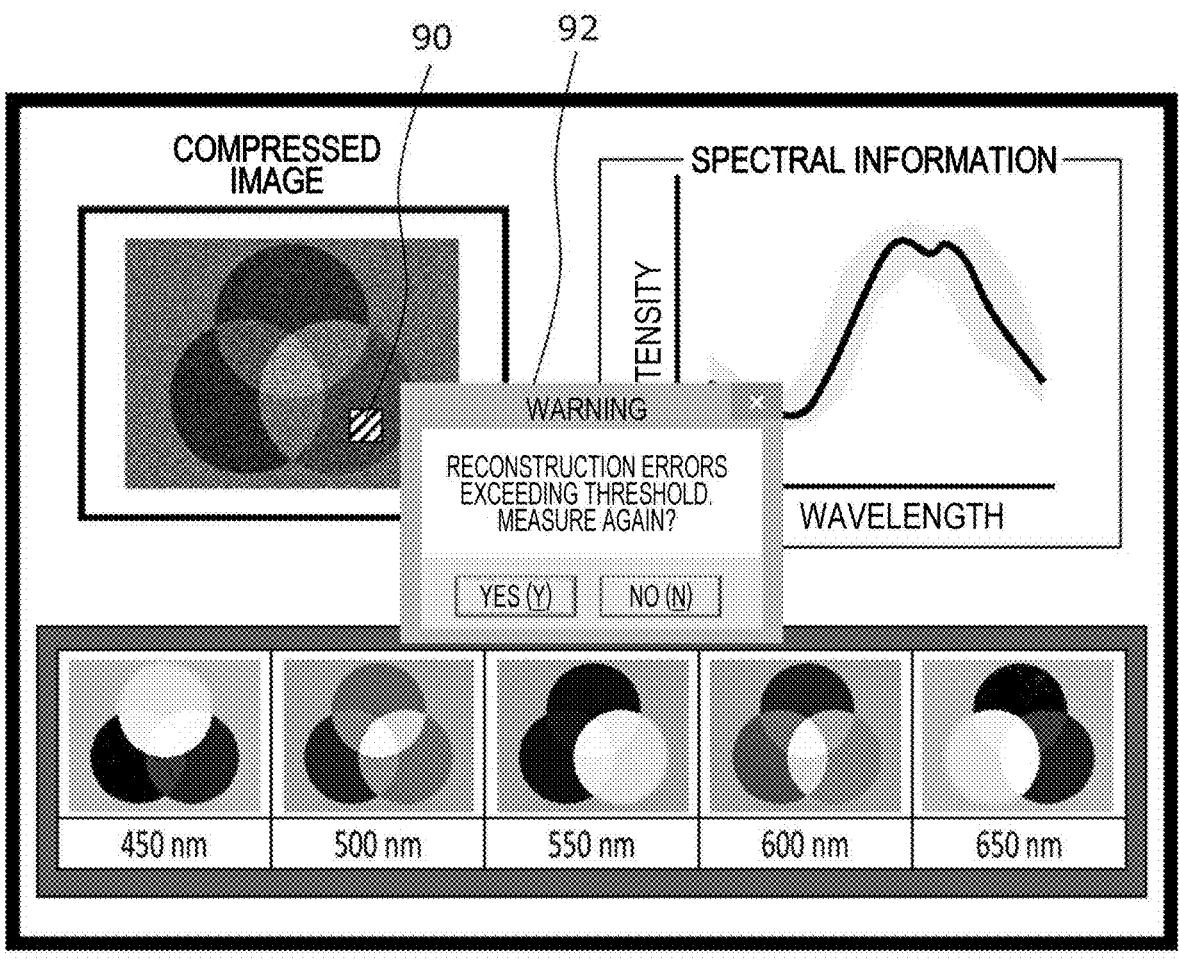
FIG. 14 is a diagram illustrating an example of a user interface (UI) having a function of displaying a warning if a reconstruction error exceeds a certain threshold.

FIG. 14 is a diagram illustrating an example of a UI having a function of displaying a warning when an estimated reconstruction error exceeds a certain threshold. In the example illustrated in FIG. 14, a compressed image, reconstructed images (also called spectral images) corresponding to different wavelength bands, and spectral information are displayed in an upper-left part, a lower part, and an upper-right part of a screen, respectively.

In this example, a reconstructed image is displayed for each of relatively wide bands having a width of 50 nm. The width of bands of displayed reconstructed images is not limited to this example, and may be set as desired. The signal processing circuit 210 may perform the reconstruction process for each of relatively narrow bands having a width of 5 nm, for example, generate a reconstructed image of one relatively wide band by combining together reconstructed images of continuous bands, and display the reconstructed image on the display device 300, instead.

The spectral information in the example illustrated in FIG. 14 indicates a spectrum obtained for a rectangular specified area 90 in the compressed image. The specified area 90 may be specified, for example, by the user. Although the specified area 90 is an area including pixels in the example illustrated in FIG. 14, a point may be specified, instead. A curve in the spectral information indicates an average of pixel values in the specified area 90 for each wavelength. A gray part of the spectral information indicates a range from a minimum value to a maximum value of pixel values in the specified area 90 at each wavelength or spatial variation in the spectrum, such as a standard deviation. The spatial variation can be caused due to, for example, lighting or a shape of a subject. In the present embodiment, a reconstruction error is estimated using one of the above-described methods independently of the spatial variation in the spectrum. If the estimated reconstruction error exceeds the threshold, the signal processing circuit 210 displays a warning 92 illustrated in FIG. 14 on the display device 300 to prompt the user to perform measurement again or stop the process.

Figure 15:
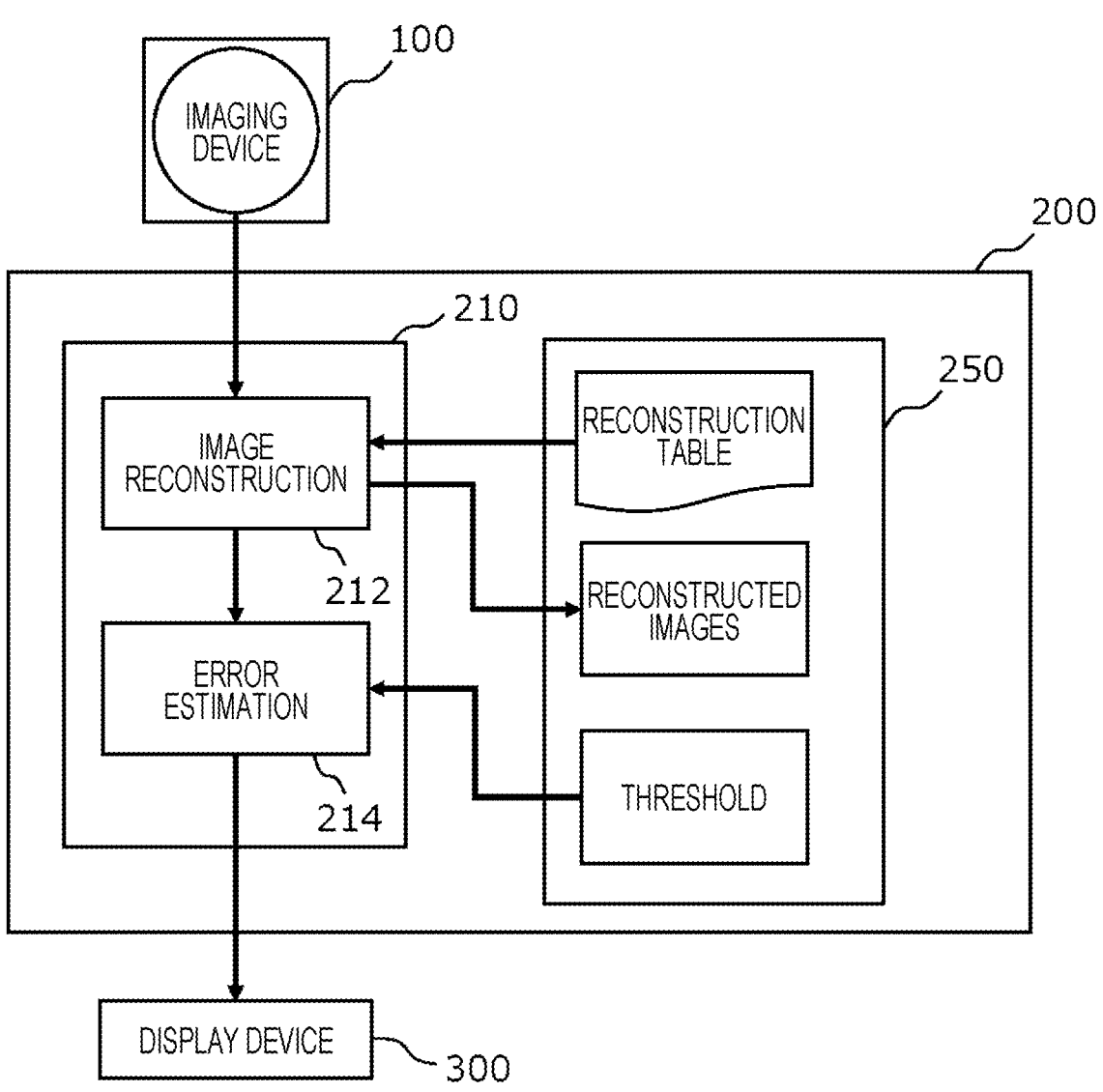
FIG. 15 is a block diagram illustrating an example of the configuration of a system that displays a warning.

FIG. 15 is a block diagram illustrating an example of the configuration of a system that displays a warning. In this example, the storage device 250 stores a maximum allowed value of a reconstruction error as a threshold. The signal processing circuit 210 refers to the threshold and, if the reconstruction error is larger than the threshold, displays the warning on the display device 300. When the error is estimated on the basis of comparison between spectra as in the example illustrated in FIG. 9, the storage device 250 also stores data regarding comparison spectra. When the error is estimated on the basis of comparison between spatial frequencies, the storage device 250 stores data regarding spatial frequencies of the reference subject.

Figure 16:
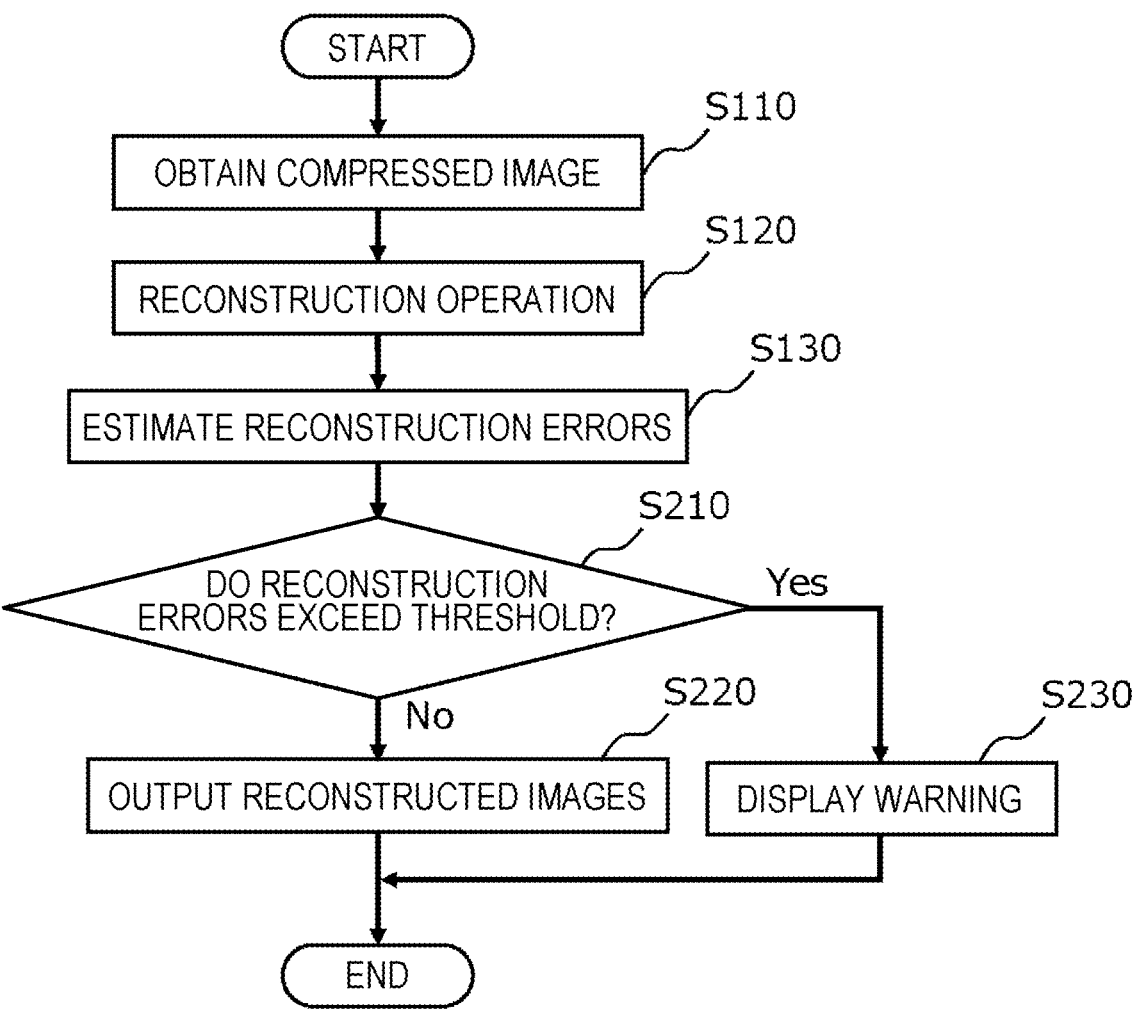
FIG. 16 is a flowchart illustrating an operation of the signal processing circuit in the example illustrated in FIG. 14.

FIG. 16 is a flowchart illustrating an operation of the signal processing circuit 210 in this example. Steps S110 to S130 are the same as the corresponding operations illustrated in FIG. 7. In the example illustrated in FIG. 16, the signal processing circuit 210 determines, after estimating the reconstruction error in step S130, whether the reconstruction error exceeds the threshold (step S210). If the reconstruction error does not exceed the threshold, the signal processing circuit 210 outputs the reconstructed images (step S220). If the reconstruction error exceeds the threshold, the signal processing circuit 210 causes the display device 300 to display the warning (step S230). As a result of these operations, the user can be prompted to perform measurement again or stop the process if the reconstruction error exceeds the threshold.

4-2. Displaying Error in Value

Figure 17:
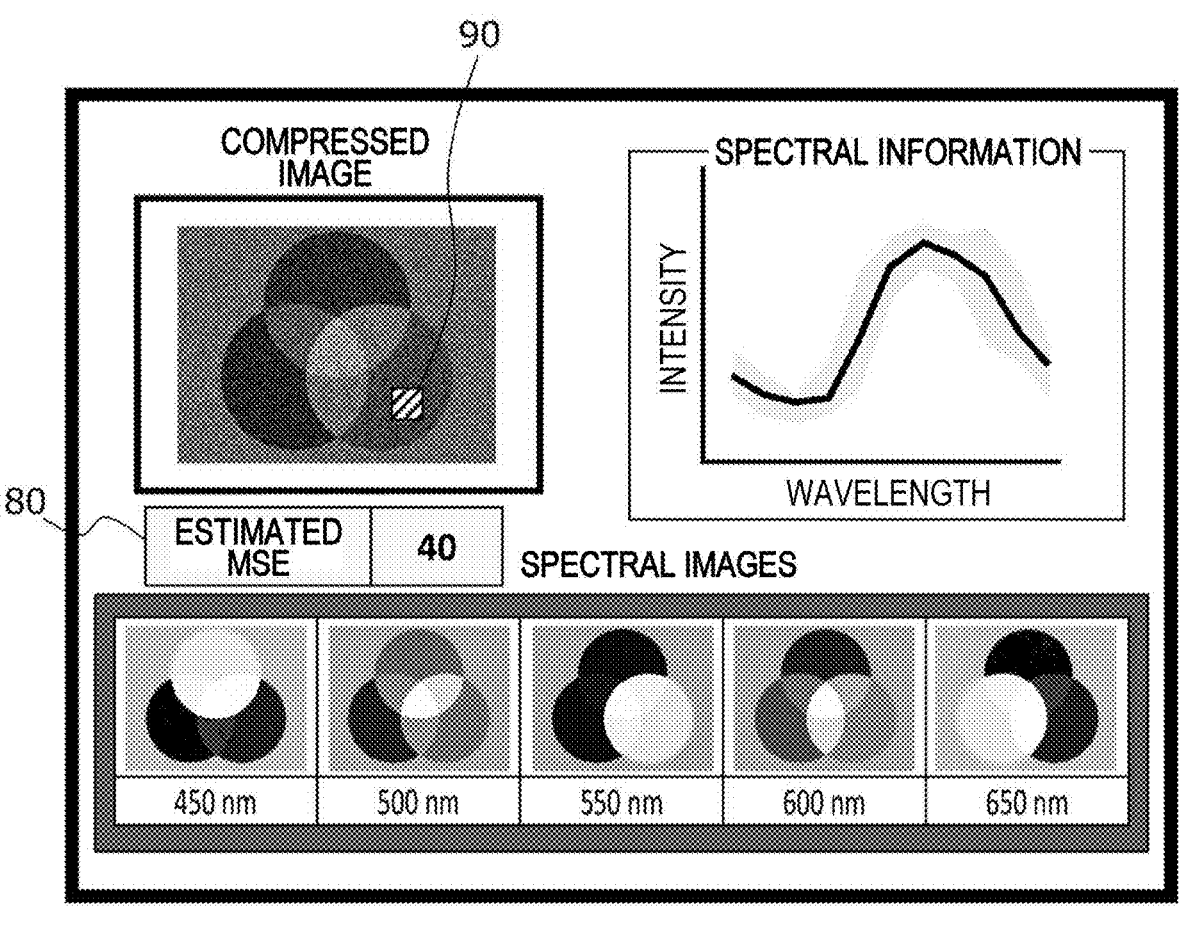
FIG. 17 is a diagram illustrating an example of a UI that displays an estimated error as a value.

FIG. 17 illustrates an example of a UI that displays an estimated error as a value. In this example, the signal processing circuit 210 causes the display device 300 to display a value 80 indicating an estimated reconstruction error. In the example illustrated in FIG. 17, an average of values of MSE in the specified area 90 for different wavelength bands is displayed as the reconstruction error. The error may be represented another error index, a symbol such as A, B, or C, an indicator such as "high", "moderate", or "low", or text such as "good", "ordinary", or "bad" instead of the MSE. When an estimated reconstruction error is displayed on a screen like this, the user can evaluate validity of a displayed result of reconstruction.

4-3. Displaying Error Over Spectrum

Figure 18:
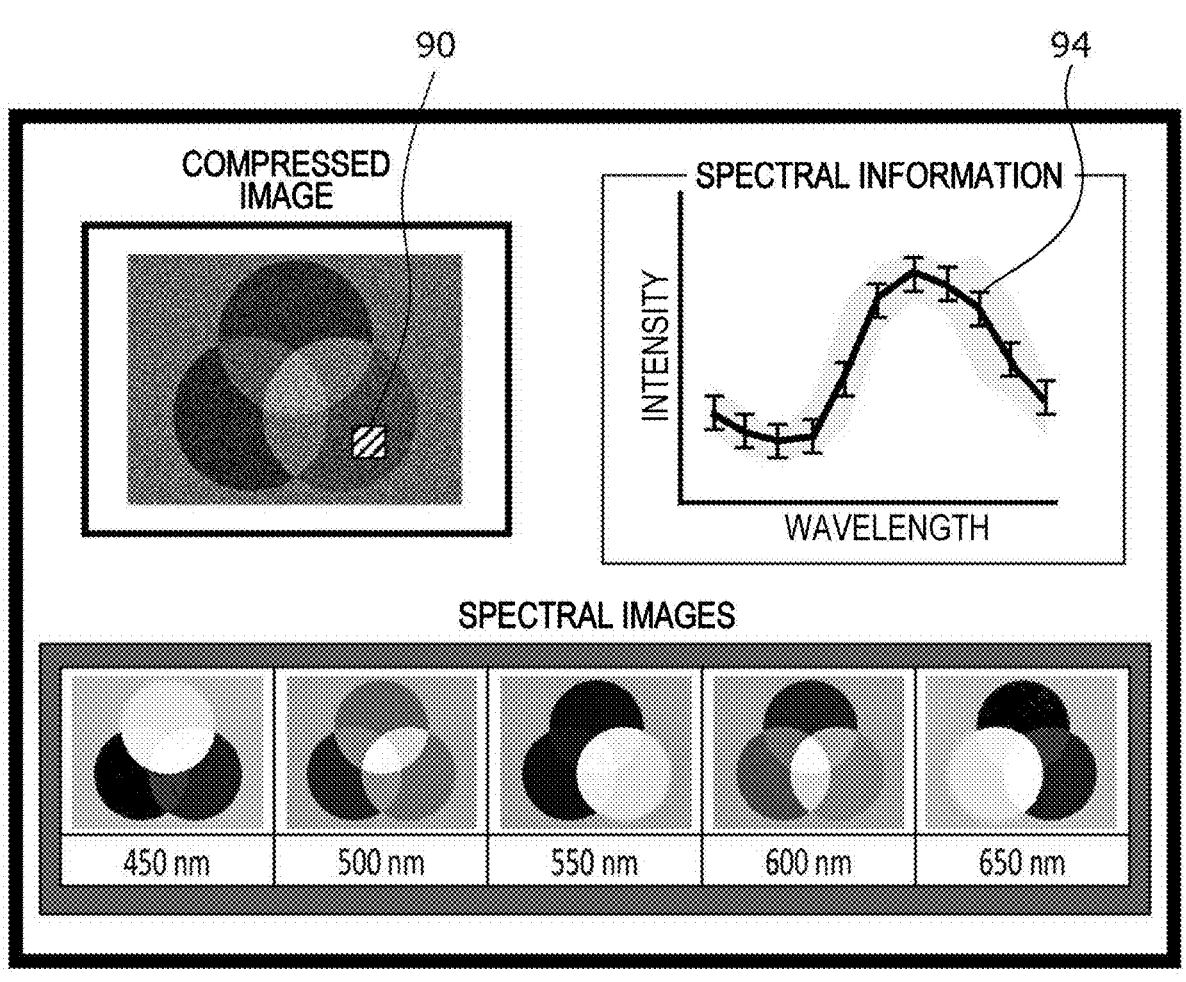
FIG. 18 is a diagram illustrating an example of a UI that displays an estimated error over a spectrum.

FIG. 18 illustrates an example of a UI that displays an estimated error over a spectrum. In this example, the spatial variation in the spectrum of the specified area 90 is displayed in gray in the upper-right part, where the spectral information is displayed, and the estimated reconstruction error is displayed as error bars 94. A point in the compressed image may be specified instead of the specified area 90 including pixels. In this case, the gray indication indicating the spatial variation in the spectrum is not displayed. Even when a point is specified, however, a reconstruction error may be estimated and displayed as error bars 94. The signal processing circuit 210 calculates spatial variation in a spectrum and an estimated error caused through a reconstruction operation independently of each other. The spatial variation or the estimated error might be generally larger than the other, or larger or smaller than the other depending on the wavelength band.

In this example, spatial variation in a spectrum and an estimated error caused through a reconstruction operation are separately displayed. As a result, when a spectrum greatly varies, the user can check whether a factor of the variation is lighting or a measurement optical system, or an error caused through the reconstruction process.

An evaluation function is uniquely determined for an obtained compressed image or an area in the compressed image including pixels. Errors estimated from the evaluation function, therefore, does not include information regarding wavelength. Because the same error value is calculated for all wavelength bands in the example illustrated in FIG. 18, the width of the displayed error bars 94 is the same regardless of the band.

Although the estimated error is displayed as the error bars 94 in the example illustrated in FIG. 18, the estimated error may be displayed in another format, that is, for example, as a translucent area, instead.

Figure 19:
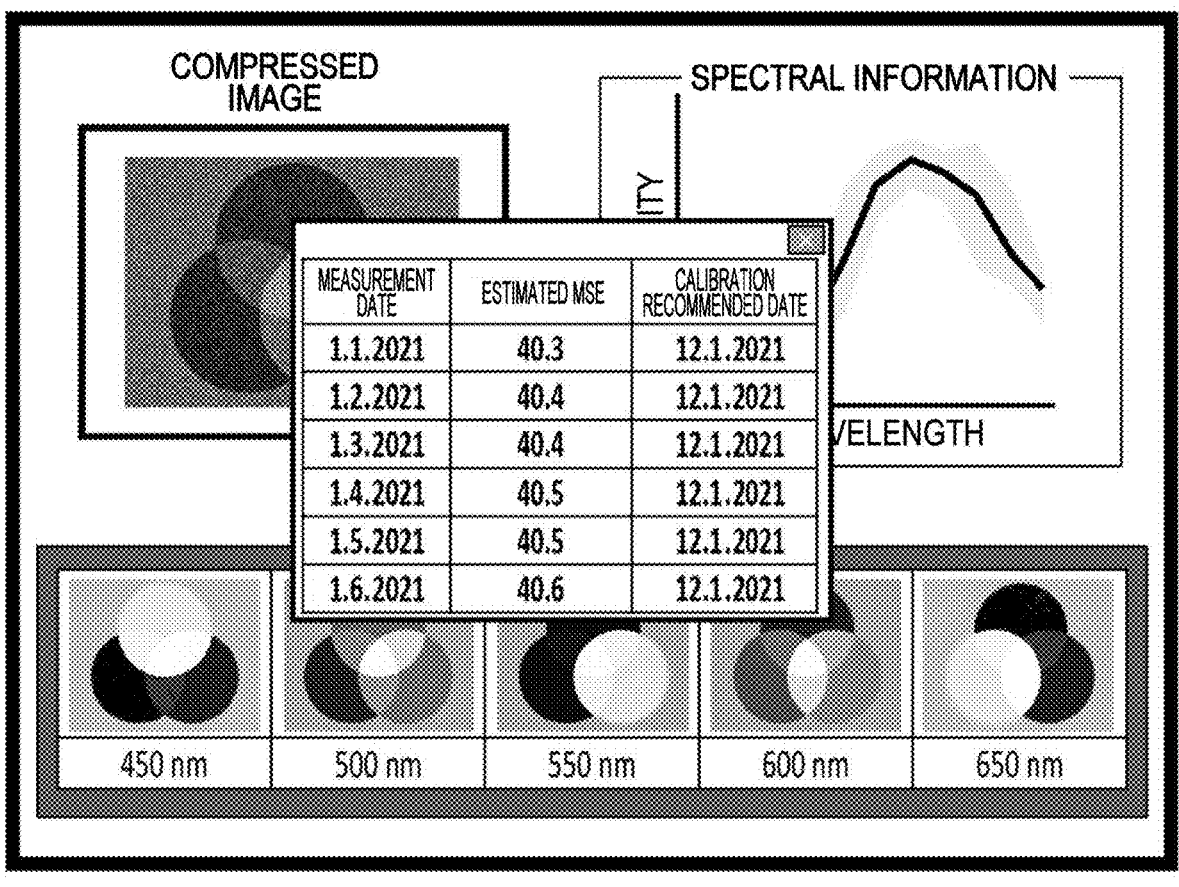
FIG. 19 is a diagram illustrating an example of a UI having a function of predicting, on the basis of temporal changes in a reconstruction error, a time when the reconstruction error will exceed a threshold.
Figure 20:
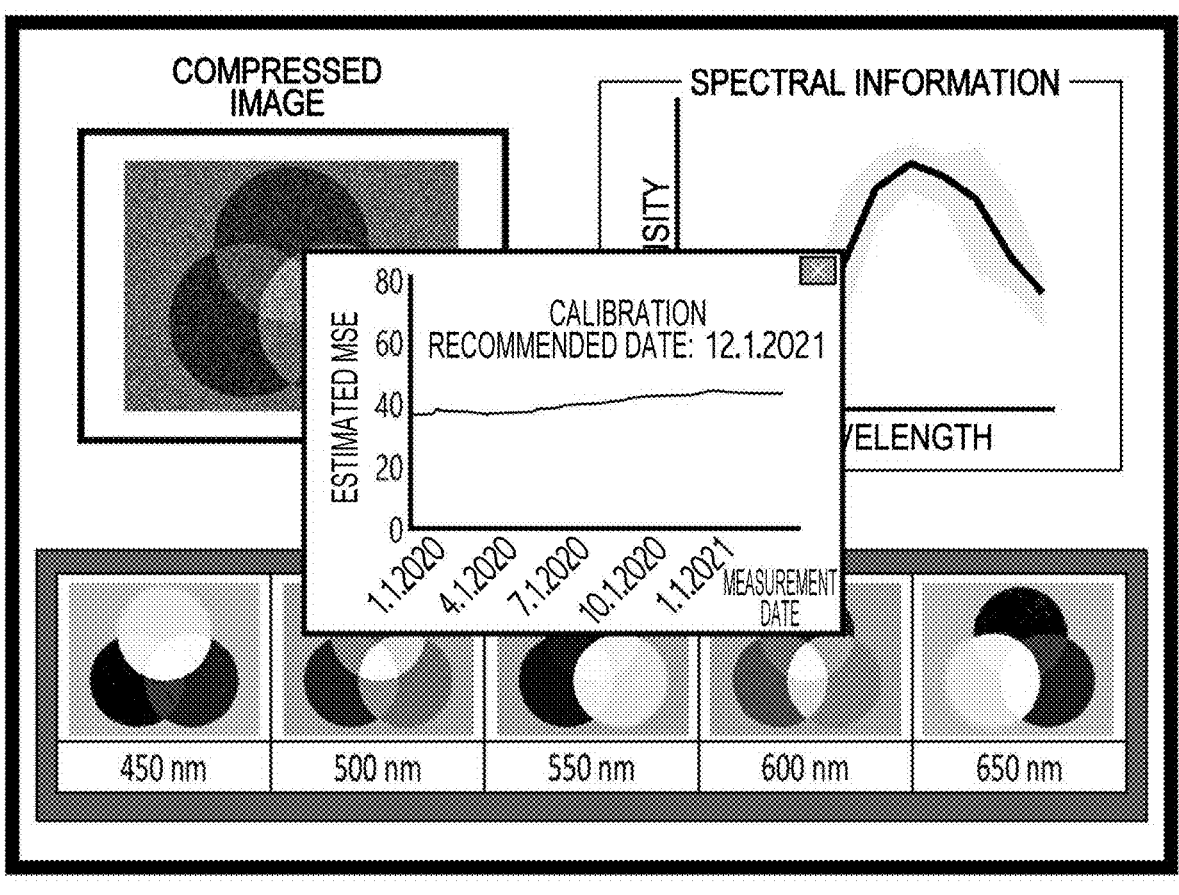
FIG. 20 is a diagram illustrating another example of the UI having the function of predicting, on the basis of temporal changes in a reconstruction error, a time when the reconstruction error will exceed a threshold.

5. Prediction of Time of Occurrence of Error Based on Temporal Changes in Reconstruction Error FIG. 19 is a diagram illustrating an example of a UI having a function of predicting, on the basis of temporal changes in an estimated reconstruction error, a time when the reconstruction error will exceed a threshold and be detected as an error. In this example, the signal processing circuit 210 stores an estimated error in the storage device 250, predicts, on the basis of temporal changes in the error, a time when the error will exceed a threshold, and outputs a signal indicating the predicted time. The signal processing circuit 210, for example, may estimate a reconstruction error each time performing the reconstruction process, and then store the estimated reconstruction error in the storage device 250 along with information regarding a date and a time. The signal processing circuit 210 may store, along with the information regarding a date and a time, a value of the reconstruction error, that is, for example, an average calculated in units of a certain period of time such as one day. The signal processing circuit 210 may predict, on the basis of a trend of temporal changes in the reconstruction error, a date when the reconstruction error will exceed the threshold and display the date on the display device 300 as an error prediction date or a calibration recommended date. In the example illustrated in FIG. 19, a table including information regarding measurement dates, values of MSE calculated as errors, and calibration recommended dates is displayed. As in this example, by associating estimated reconstruction errors with measurement dates or dates and times, an error log can be stored, and a date and a time when the error will exceed the threshold can be predicted. An error log and a predicted time when the error will exceed a threshold may be displayed as a graph, instead, as illustrated in FIG. 20.

Figure 21:
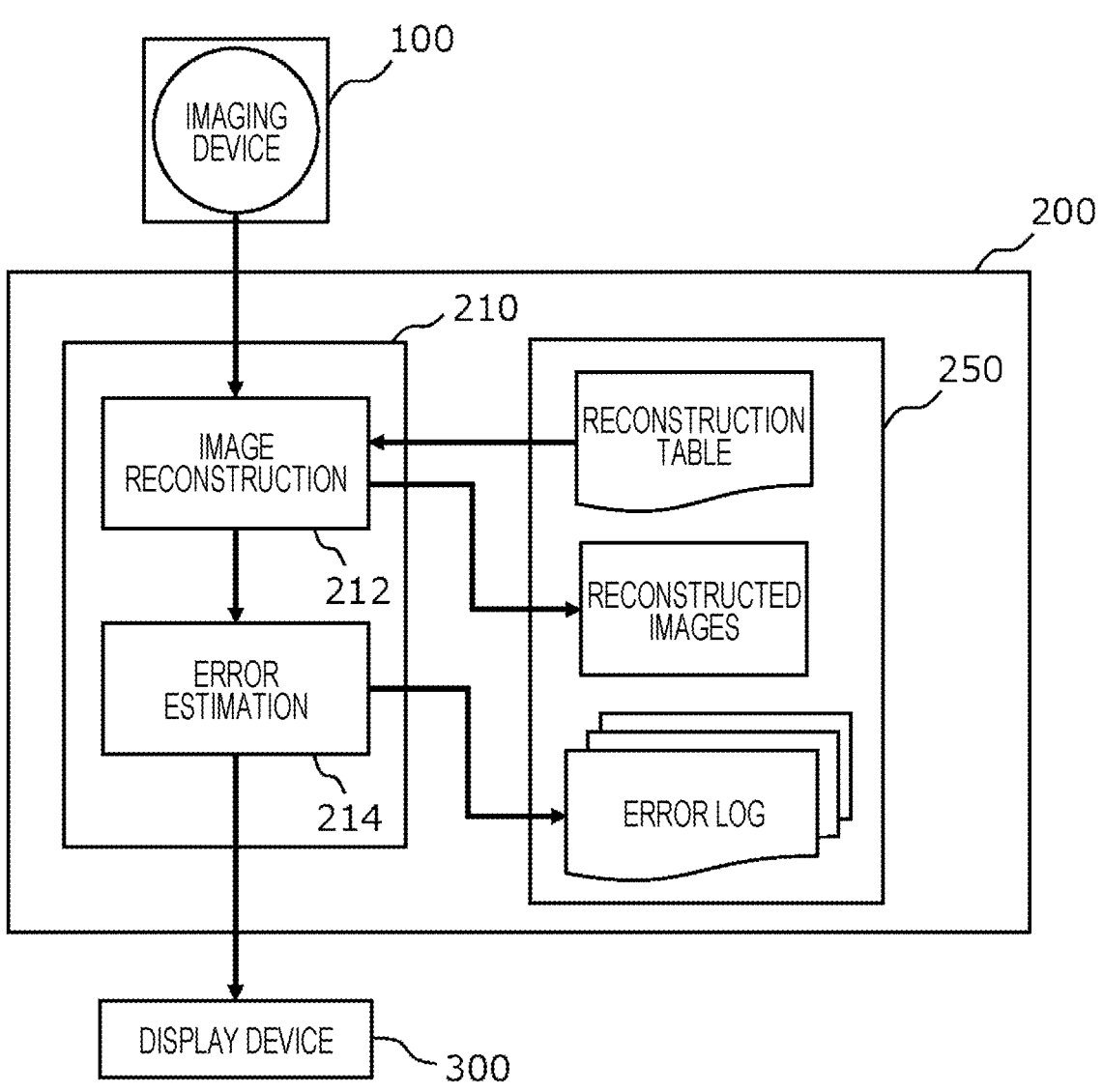
FIG. 21 is a block diagram illustrating the configuration of an image processing device 200 that predicts, on the basis of temporal changes in a reconstruction error, a time when the reconstruction error will exceed a threshold.
Figure 22:
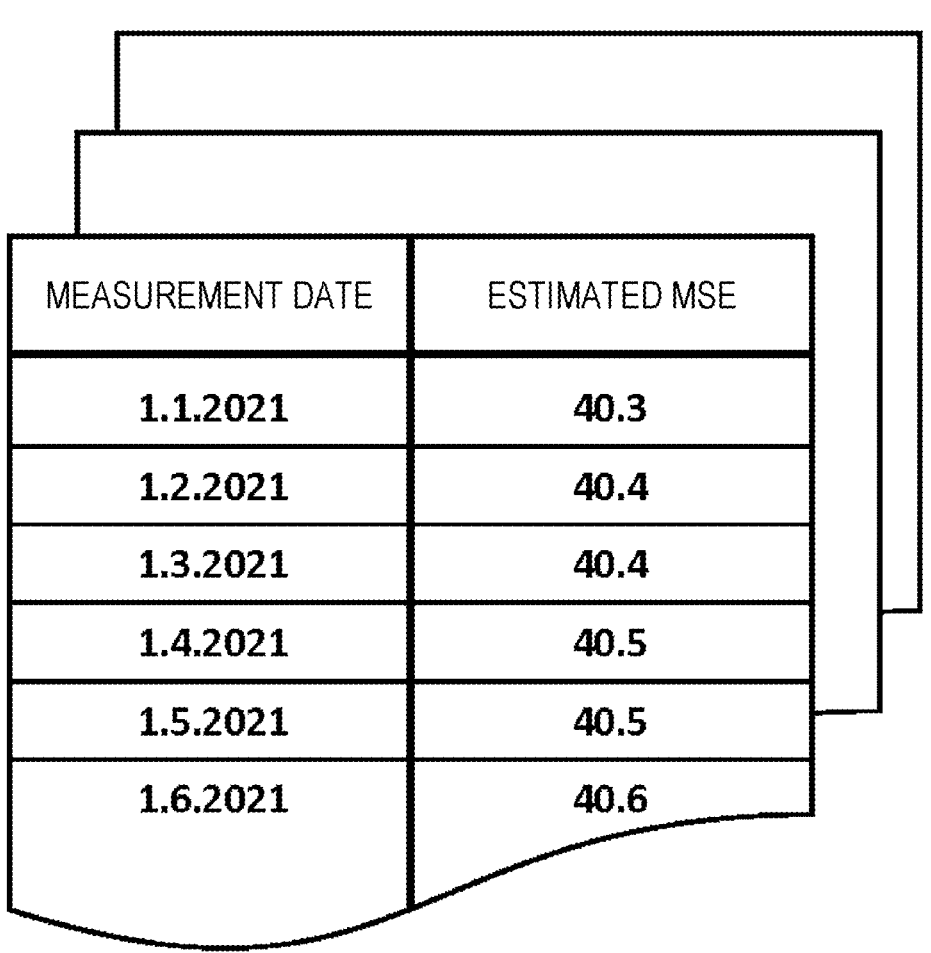
FIG. 22 is a diagram illustrating an example of log information regarding a reconstruction error.

FIG. 21 is a block diagram illustrating the configuration of the image processing device 200 that predicts a time of occurrence of an error on the basis of temporal changes in an estimated error. In this example, the signal processing circuit 210 stores an error log in the storage device 250 each time estimating an error. The error log may be stored, as illustrated in FIG. 22, for example, in a format including information regarding dates and estimated errors (e.g., an error index such as MSE, RMSE, or PSNR). The signal processing circuit 210 predicts, on the basis of a trend of temporal changes in the error stored day by day, a time when the error will exceed a threshold and displays information indicating the predicted time on the display device 300. A computer used by the user, such as a mobile terminal, may be notified of the information indicating the predicted time.

The present disclosure also includes the following cases.

(1) As described in the embodiment, the number of elements of the data g regarding the compressed image 10 may be n×m, and the number of elements of the data f regarding reconstructed images, which are reconstructed from the compressed image 10, may be n×m× N. In other words, reconstructed images may include more signals than those included in a compressed image.

(2) A reconstruction error estimated by the signal processing circuit 210 may be different from an error calculated using a correct image. A correct image may be an image obtained using a method different from a method for reconstructing images from the compressed image 10. The correct image may be, for example, an image obtained by a common color camera or an image generated through a simulation.

(3) A compressed image and reconstructed images may be generated through imaging based on a method different from imaging that employs an encoding mask including optical filters, instead.

In the configuration of the imaging device 100, for example, light reception characteristics of an image sensor may be changed for each pixel by processing the image sensor 160, and a compressed image may be generated through imaging that employs the processed image sensor 160. That is, an imaging device having a configuration where the filter array 110 is essentially built in an image sensor may generate a compressed image. In this case, coding information is information corresponding to the light reception characteristics of the image sensor.

A configuration where an optical element such as metalenses may be introduced to at least a part of the optical system 140 to change optical characteristics of the optical system 140 in terms of space and wavelength and compress spectral information may be employed, and an imaging device having the configuration may generate a compressed image, instead. In this case, coding information is information corresponding to the optical characteristics of the optical element such as metalenses. Intensity of incident light may thus be modulated for each wavelength, a compressed image and reconstructed images may be generated, and a reconstruction error in the reconstructed images may be estimated using an imaging device 100 having a configuration different from that where the filter array 110 is used.

In other words, the present disclosure also includes an image processing apparatus including a storage device storing coding information corresponding to photoresponse characteristics of an imaging device including light receiving areas whose photoresponse characteristics are different from one another and a signal processing circuit that generates, on the basis of a compressed image generated by the imaging device and the coding information, reconstructed images including more signals than those included in the compressed image, that estimates an error in the reconstructed images, and that outputs a signal indicating the error.

As described above, the photoresponse characteristics may correspond to the light receiving characteristics of the image sensor or the optical characteristics of the optical element.

The techniques in the present disclosure are effective, for example, for cameras and measuring devices that obtain multiwavelength or high-resolution images. The techniques in the present disclosure can be applied to, for example, sensing for biological, medical, and cosmetic purposes, inspection systems for foreign objects or pesticide residues in food products, remote sensing systems, and in-vehicle sensing systems.

What is claimed is:

1. An image processing apparatus comprising:
a storage device storing coding information indicating light transmission characteristics of an encoding mask including optical filters that are arranged in two dimensions and whose light transmission characteristics are different from one another; and
a signal processing circuit that generates, on a basis of a compressed image generated through imaging that employs the encoding mask and the coding information, reconstructed images including more signals than signals included in the compressed image,
wherein the signal processing circuit estimates an error in the reconstructed images on a basis of the compressed image, the reconstructed images, and the coding information, and outputs a signal indicating the error.

2. The image processing apparatus according to claim 1, wherein the signal processing circuit estimates the error on a basis of values of an evaluation function based on the compressed image, the reconstructed images, and the coding information.

3. The image processing apparatus according to claim 1, wherein the storage device also stores a reference image indicating a reference subject,
wherein the compressed image is generated by capturing, using the encoding mask, an image of a scene including the reference subject and a target subject to be obtained through reconstruction, and
wherein the signal processing circuit estimates the error on a basis of comparison between the reference image and an area in the reconstructed image indicating the reference subject.

4. The image processing apparatus according to claim 1, wherein the storage device also stores reference information indicating a spectrum of a reference subject,
wherein the compressed image is generated by capturing, using the encoding mask, an image of a scene including the reference subject and a target subject to be obtained through reconstruction, and
wherein the signal processing circuit estimates the error on a basis of a difference between spectra of an area in the reconstructed images corresponding to the reference subject and the spectrum indicated by the reference information.

5. The image processing apparatus according to claim 4, wherein the reference information is generated on a basis of an image obtained by capturing, using the encoding mask, an image of a scene including the reference subject.

6. The image processing apparatus according to claim 1, wherein the storage device also stores reference information indicating a spatial frequency of a reference subject,
wherein the compressed image is generated by capturing, using the encoding mask, an image of a scene including the reference subject and a target subject to be obtained through reconstruction, and
wherein the signal processing circuit estimates the error on a basis of a difference between spatial frequencies of an area in the reconstructed images corresponding to the reference subject and the spatial frequency indicated by the reference information.

7. The image processing apparatus according to claim 1, wherein the signal processing circuit outputs a warning if magnitude of the error exceeds a threshold.

8. The image processing apparatus according to claim 1, wherein the signal processing circuit stores the estimated error, predicts, on a basis of temporal changes in the error, a time when the error will exceed a threshold, and outputs a signal indicating the predicted time.

9. The image processing apparatus according to claim 1, wherein the optical filters have different spectral transmittances, and
wherein the reconstructed images include image information regarding wavelength bands.

10. The image processing apparatus according to claim 1, wherein the signal processing circuit displays the error and spatial variation in pixel values in the reconstructed images on a display device in a distinguishable manner.

11. The image processing apparatus according to claim 1, wherein the estimated error is different from an error calculated using a correct image.

12. The image processing apparatus according to claim 1 further comprising:
the encoding mask; and
an image sensor.

13. A method executed by a processor, the method comprising:
obtaining coding information indicating light transmission characteristics of an encoding mask including optical filters that are arranged in two dimensions and whose light transmission characteristics are different from one another;
obtaining a compressed image generated through imaging that employs the encoding mask;
generating, on a basis of the coding information, reconstructed images including more signals than signals included in the compressed image;
estimating an error in the reconstructed images on a basis of the compressed image, the reconstructed images, and the coding information; and
outputting a signal indicating the error.

14. An image processing apparatus comprising:
a storage device storing coding information corresponding to photoresponse characteristics of an imaging device including areas whose photoresponse characteristics are different from one another; and a signal processing circuit that generates, on a basis of a compressed image generated by the imaging device and the coding information, reconstructed images including more signals than signals included in the compressed image, wherein the signal processing circuit estimates an error in the reconstructed images on a basis of the compressed image, the reconstructed images, and the coding information, and outputs a signal indicating the error.

15. The image processing apparatus according to claim 14, wherein the imaging device receives light through an optical element, and wherein the coding information is information corresponding to optical characteristics of the optical element.

16. A method executed by a processor, the method comprising:

obtaining coding information indicating light transmission characteristics of an encoding mask including optical filters that are arranged in two dimensions and whose light transmission characteristics are different from one another;

obtaining a compressed image generated through imaging that employs the encoding mask;

generating, on a basis of the coding information, reconstructed images including more signals than signals included in the compressed image; and obtaining a reference image indicating a reference subject or reference information indicating a spectrum of the reference subject, wherein the compressed image is generated by capturing, using the encoding mask, an image of a scene including the reference subject and a target subject to be obtained through reconstruction, and the method further comprises:

(i) estimating an error in the reconstructed images on a basis of comparison between the reference image and an area in the reconstructed image indicating the reference subject, or (ii) estimating the error on a basis of a difference between spectra of an area in the reconstructed images corresponding to the reference subject and the spectrum indicated by the reference information; and outputting a signal indicating the error.

17. A method executed by a processor, the method comprising:

obtaining coding information indicating light transmission characteristics of an encoding mask including optical filters that are arranged in two dimensions and whose light transmission characteristics are different from one another;

obtaining a compressed image generated through imaging that employs the encoding mask;

generating, on a basis of the coding information, reconstructed images including more signals than signals included in the compressed image;

estimating an error in the reconstructed images;

storing the estimated error;

predicting, on a basis of temporal changes in the error, a time when the error will exceed a threshold; and outputting a signal indicating the predicted time.

18. A method executed by a processor, the method comprising:

obtaining coding information indicating light transmission characteristics of an encoding mask including optical filters that are arranged in two dimensions and whose light transmission characteristics are different from one another;

obtaining a compressed image generated through imaging that employs the encoding mask;

generating, on a basis of the coding information, reconstructed images including more signals than signals included in the compressed image;

estimating an error in the reconstructed images; and outputting a signal indicating the error, wherein the optical filters have different spectral transmittances, and wherein the reconstructed images include image information regarding wavelength bands.

19. A method executed by a processor, the method comprising:

obtaining coding information indicating light transmission characteristics of an encoding mask including optical filters that are arranged in two dimensions and whose light transmission characteristics are different from one another;

obtaining a compressed image generated through imaging that employs the encoding mask;

generating, on a basis of the coding information, reconstructed images including more signals than signals included in the compressed image;

estimating an error in the reconstructed images; and displaying the error and spatial variation in pixel values in the reconstructed images on a display device in a distinguishable manner.

* * * * *